(12) United States Patent
Vranish

(10) Patent No.: US 7,989,992 B2
(45) Date of Patent: Aug. 2, 2011

(54) LINEAR TAPE MOTOR

(76) Inventor: John M. Vranish, Crofton, MD (US)

( * ) Notice: Subject to any disclaimer, the term of this patent is extended or adjusted under 35 U.S.C. 154(b) by 232 days.

(21) Appl. No.: 12/462,701

(22) Filed: Aug. 7, 2009

(65) Prior Publication Data
US 2011/0032060 A1 Feb. 10, 2011

(51) Int. Cl.
*H02K 41/02* (2006.01)
(52) U.S. Cl. .................................. 310/12.05; 310/12.09
(58) Field of Classification Search .............. 310/12.01, 310/12.05, 12.19, 12.21
See application file for complete search history.

(56) References Cited

U.S. PATENT DOCUMENTS

| | | | |
|---|---|---|---|
| 3,174,716 A | 3/1965 | Salter | |
| 3,629,754 A | 12/1971 | Sobottka et al. | |
| 5,585,772 A | 12/1996 | Joshi et al. | |
| 5,703,553 A | 12/1997 | Bushko et al. | |
| 5,719,451 A * | 2/1998 | Cook et al. | 310/12.27 |
| 5,739,601 A | 4/1998 | Tsodikov | |
| 5,898,243 A * | 4/1999 | Dona et al. | 310/12.05 |
| 6,246,132 B1 | 6/2001 | Joshi et al. | |
| 6,249,064 B1 | 6/2001 | Bradbury | |
| 6,410,999 B1 * | 6/2002 | Vranish et al. | 310/26 |
| 6,853,103 B2 | 2/2005 | Moriyasu | |
| 6,979,389 B2 | 12/2005 | Hao et al. | |
| 7,190,247 B2 * | 3/2007 | Zimmerling | 335/205 |
| 7,288,861 B1 * | 10/2007 | Willard et al. | 310/15 |
| 7,323,960 B2 | 1/2008 | Maruyama | |
| 7,504,921 B2 | 3/2009 | Vranish | |
| 7,868,492 B2 * | 1/2011 | Teo et al. | 310/29 |
| 2009/0146507 A1 * | 6/2009 | Teramachi et al. | 310/12 |

OTHER PUBLICATIONS

Vranish, J.M., Driven Ground, U.S. Appl. No. 11/535,872, filed Sep. 27, 2006 entitled Device, System and Method for Sensing Electrical Circuit GSC15,042-1.

* cited by examiner

*Primary Examiner* — Thanh Lam

(57) ABSTRACT

A Linear Tape Motors sequentially bends flexures to precisely position a payload within a large, linear range. Movement is backlash free. Flexure bending is also used to drive large forces, using efficient mechanical advantage, anchor the Tape Motor against back-slipping and prevent sticking and jamming malfunctions. Existing permanent magnet motor drive technology can be easily adapted to energize and control the flexure bending motions. Combining flexures with rare earth permanent magnets, provides ultra compact Linear Tape Motors with very high power and force densities that hold position with power off. Their operating range can be is as long as required. Thus, Linear Tape Motors are attractive for space science instruments, where precision positioning in ultra cold operating conditions is required and where low mass and low power are premium. But, they will be attractive to many other applications as well, especially where long range, safe, precise movements of large force payloads are required, where simplicity and reliability are important, where speeds are moderate to low and where operating temperatures are not so extreme as to demagnetize the permanent magnets. The Linear Tape Motor concept is novel but, it is simple and is easily adapted to modern permanent magnet motor technology, both the hardware materials and construction methods and the electronics and computer technology that controls the hardware. Development should be short and inexpensive, with high prospects of success.

30 Claims, 14 Drawing Sheets

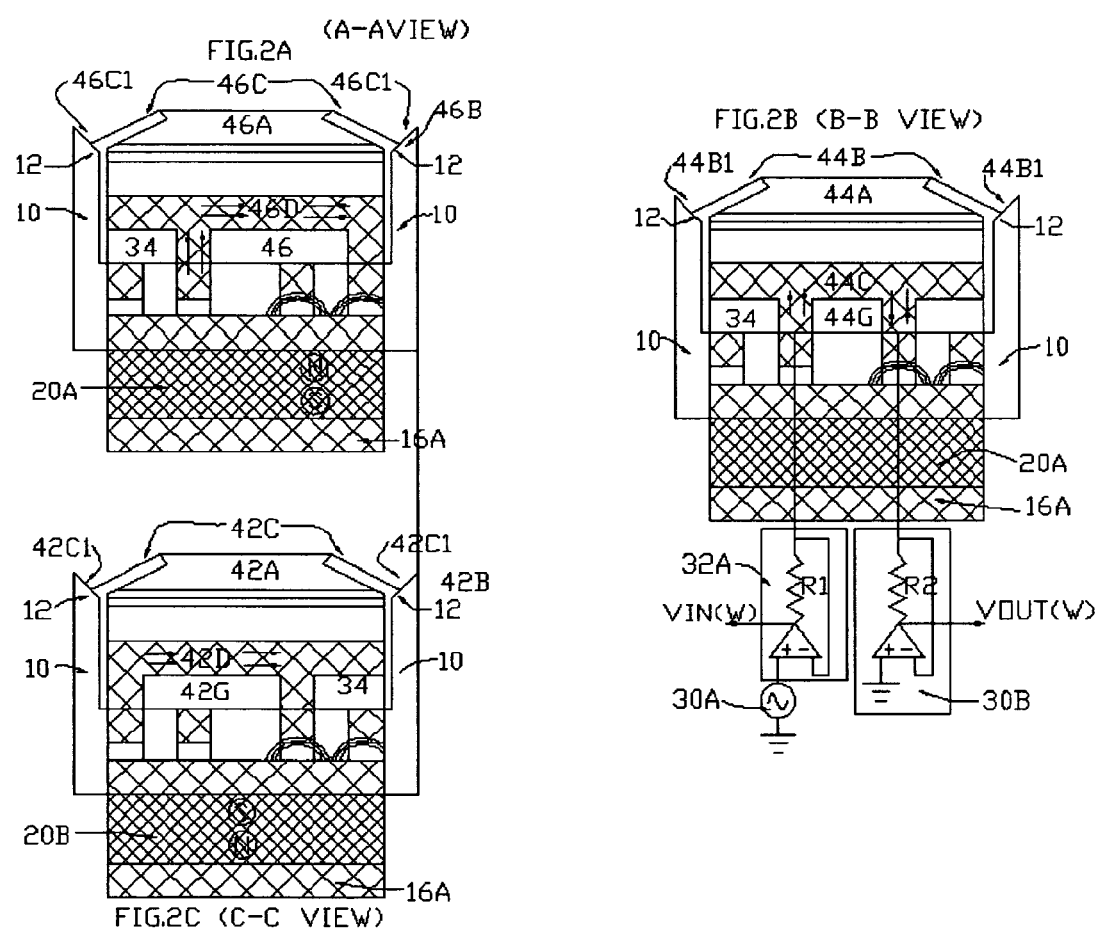

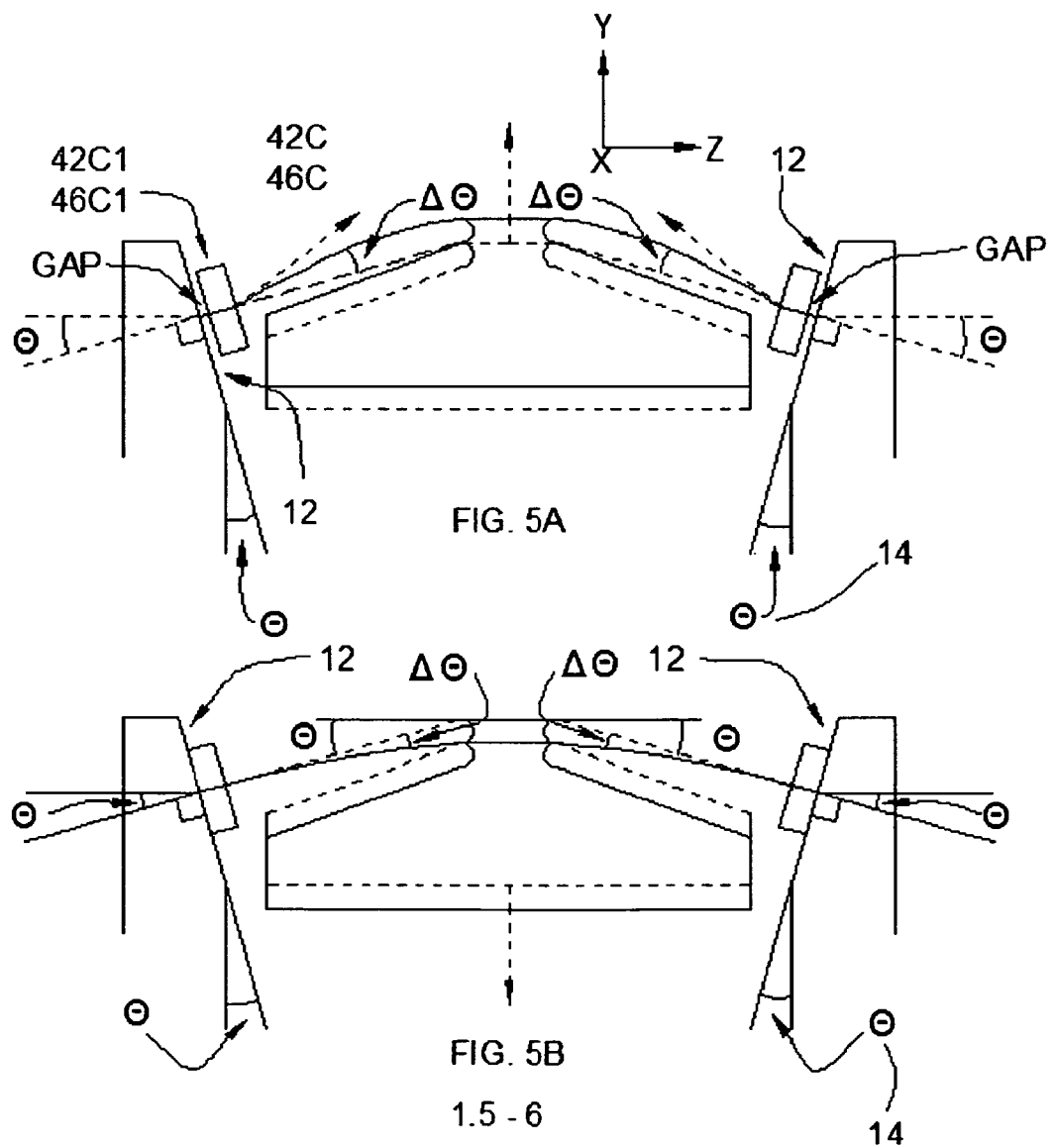

SECTION
A-A

SECTION
B-B

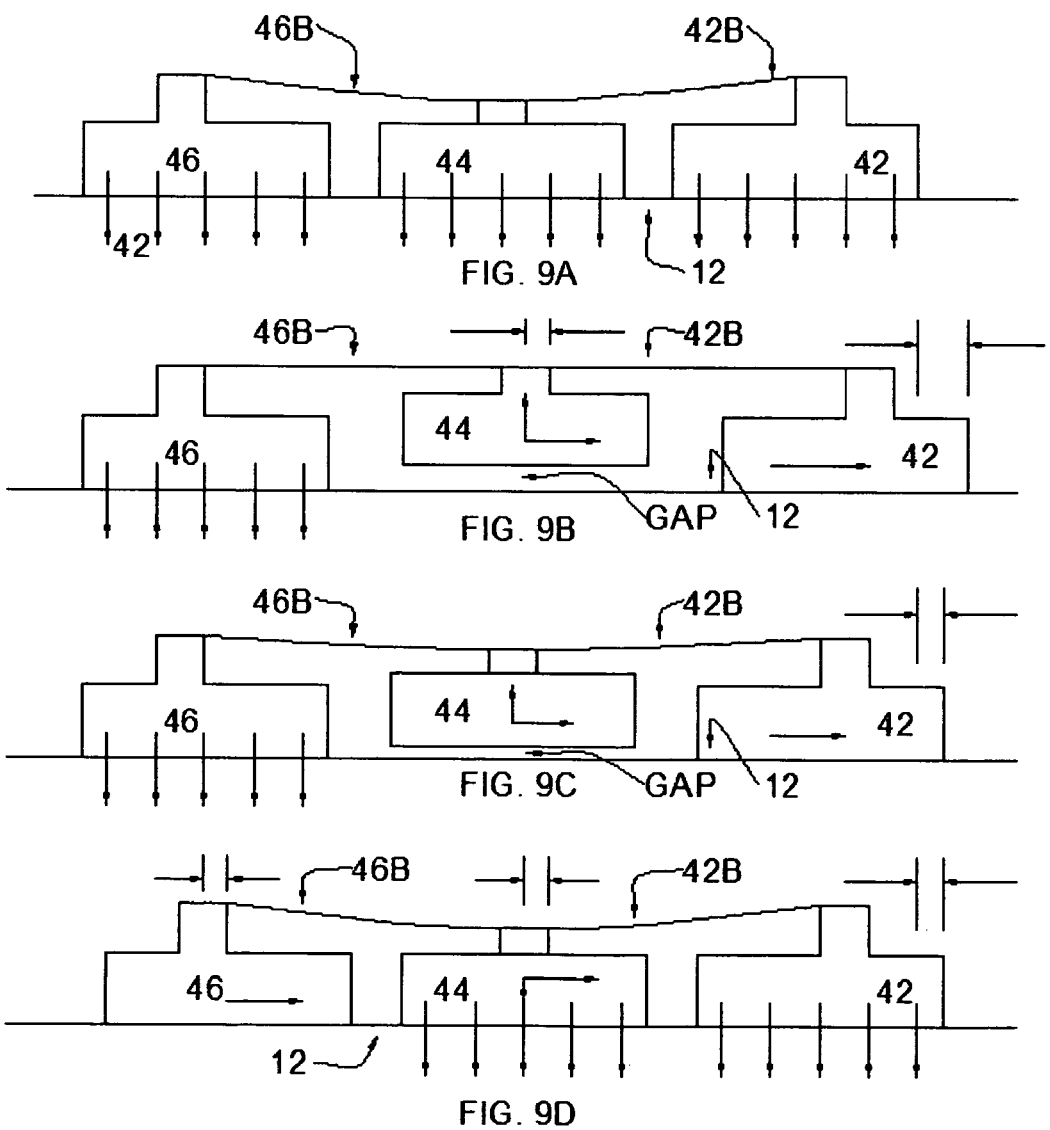

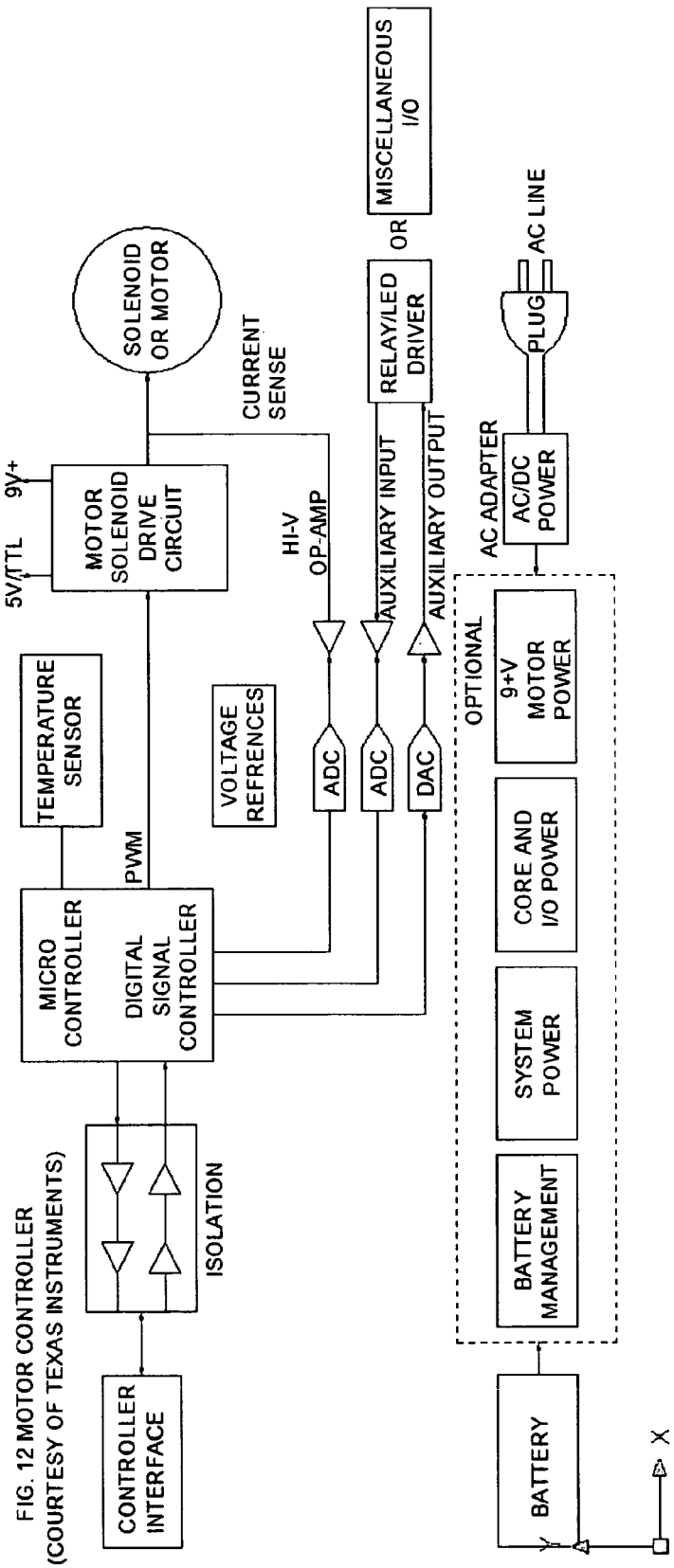

FIG. 13 DUAL 4-A PEAK HIGH SPEED LOW-SIDE POWER MOSFET DRIVERS
(COURTESY OF TEXAS INSTRUMENTS)

FEATURES

- INDUSTRY STANDARD PIN-OUT HIGH CURRENT DRIVE CAPABILITY OF +/- 4 A AT THE MILLER PLATEAU REGION
- EFFICIENT CONSTANT CURRENT SOURCING EVEN AT LOW SUPPLY VOLTAGES
- TTL/CMOS COMPATIBLE INPUTS INDEPENDENT OF SUPPLY VOLTAGE 20-nS TYPICAL RISE AND 15-nS TYPICAL FALL TIMES WITH 1.8-nF LOAD
- TYPICAL PROPOGATION DELAY TIMES OF 25 nS WITH INPUT FALLING AND 35 nS WITH INPUT RISING
- 4-V TO 15-V SUPPLY VOLTAGE
- SUPPLY CURRENT OF 0.3 mA
- DUAL OUTPUTS CAN BE PARALELLED FOR HIGHER DRIVE CURRENT
- AVAILABLE IN THERMALLY ENHANCED MSOP
- POWER PAD TM PACKAGE WITH 4.7° C/W θjc
- RATED FROM -40°C TO 85°C
- TRUE DRIVE OUTPUT ARCHITECTURE USING BIPOLAR AND CMOS TRANSISTORS IN PARALLEL

APPLICATIONS

- SWITCH MODE POWER SUPPLIES
- DC/DC CONVERTERS
- MOTOR CONTROLLERS
- LINE DRIVERS
- CLASS D SWITCHING AMPLIFIERS

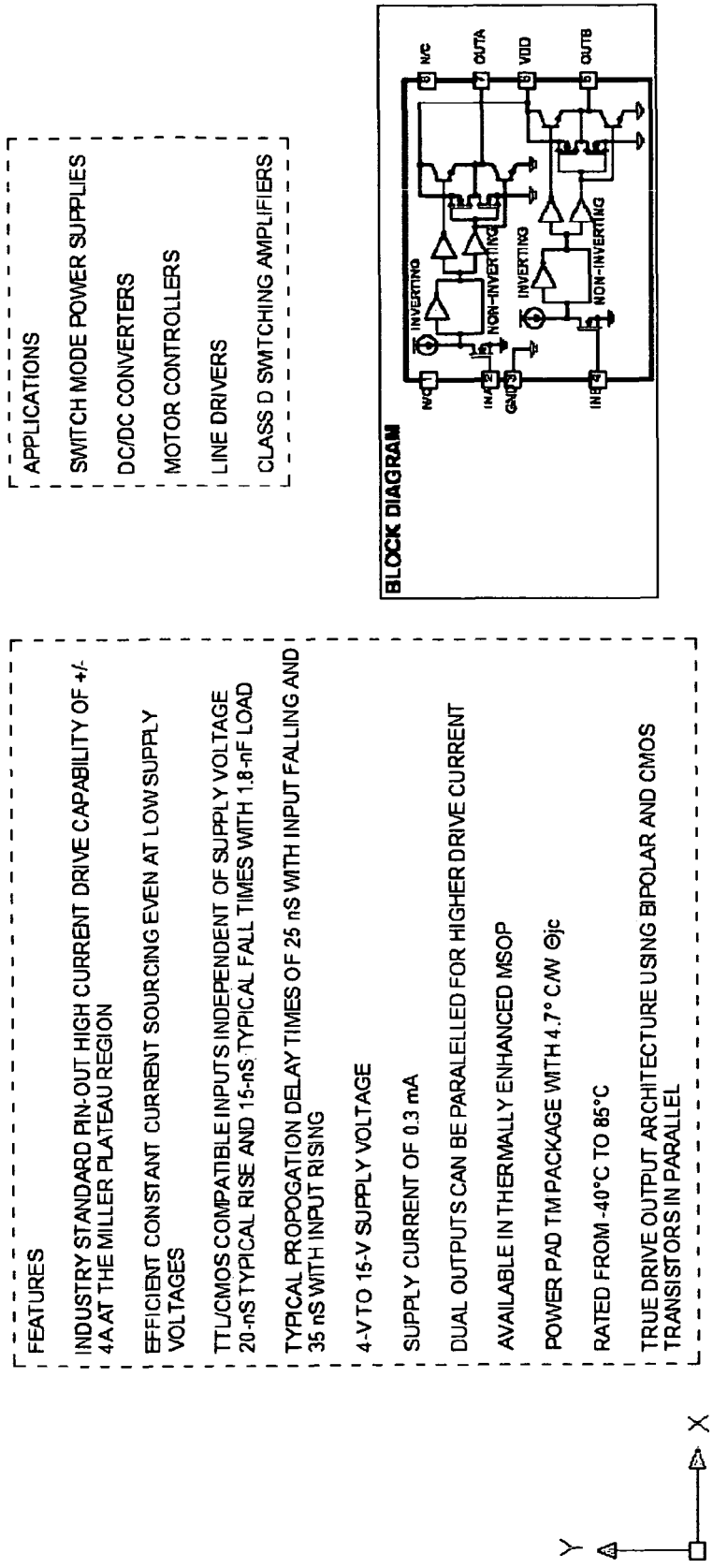

BLOCK DIAGRAM understand# LINEAR TAPE MOTOR

The rights to both inventions are held by the United States Government. The teachings of these related applications are herein meant to be incorporated by reference.

CROSS REFERENCE TO RELATED APPLICATION

The invention is related to an invention shown and described in Vranish, J. M., Stepping Flexures, U.S. Pat. No. 7,504,921, Mar. 17, 2009. The rights to this invention are held by the United States Government. The invention is, also related to an invention shown and described in Vranish, J. M., Driven Ground, application Ser. No. 11/535,872 filed Sep. 27, 2006 to PTO (filed as Device, System and Method for Sensing Electrical Circuit GSC 15,042-1.

BACKGROUND OF THE INVENTION

Precision pointing and positioning systems are widely used in telescopic systems making observations from space. The requirements on these systems are extreme. Their precision positioning requirements are extreme as are the extreme cold temperatures in which they must perform and the severe limitations of mass and available power.

Existing aerospace actuator technologies have not been adequate so new concepts have emerged, the "Inch Worm" [1] concept being one of the more popular. The "Inch Worm" concept was attractive because it could meet the extreme precision positioning requirements over long stroke distances, has low mass and power requirements and can hold position with power off. However, it used piezoelectric drive to gain precision and keep mass down and this did not perform properly in the ultra cold operating conditions of space so the "Inch Worm" concept remains unused, pending a work around.

Linear Tape Motors revisit the advantages in the Inch Worm approach, from fresh perspectives to overcome previous Inch Worm limitations, short comings and risk. It uses flexure bending to achieve small step resolution rather than piezoelectric expansion and magnetic drives to energize the flexures and hold position with power off. Flexures and permanent magnet electric motor drives work at ultra cold cryogenic temperatures and have extensive heritage in electric motor applications. Since Linear Tape Motor is just another electric motor form, much available technology can be used and since the innovative aspects are simple and straight forward there is reason to expect a short, inexpensive development phase with a certain, successful outcome.

The Linear Tape Motor concept was seen to have advantages in applications beyond its original purpose so the design concept was adjusted to incorporate these as well. The flexures and rare earth permanent magnets that work so well at cryogenic temperatures also work at room temperatures and above until they demagnetize at their (very hot) curie temperatures. Miniature space actuators scale up as required to handle large loads with safety and precision.

FIELD OF THE INVENTION

The invention relates generally to electro-mechanical positioning devices and more particularly to high step resolution precision positioning devices that move and position an object at any position of choice within a long linear range wherein the object holds position with power off. The invention also relates generally to electro-mechanical devices that can operate at temperatures ranging from cryogenic ultra cold to very hot curie demagnetization temperatures. The invention relates generally to large force linear devices and more particularly to moderate to slow speed linear devices.

DESCRIPTION OF THE PRIOR ART

Linear long stroke motor and actuator devices are in common use employing several different technologies and techniques. Electro-magnetic long stroke linear actuators commonly use rotary electric motors with pinion to drive a linear rack, motorized screws to translate a nut or direct drive linear electric motors. All systems can be made to work for NASA precision space operations and were considered for the NASA James Webb Space Telescope but, were rejected in favor of the "Inch Worm" concept which promised higher step resolution and precision from a smaller and less massive package, would hold position with power off and was backlash free. The problem was that the "Inch Worm" used piezoelectric crystals to clamp and extend (drive) and these suffered severe loss in their expansion and contraction capabilities at ultra cold cryogenic temperatures. So, the James Webb Space Telescope went back to more conventional drives and the "Inch Worm" concept went back to R&D looking for a work around. The R&D effort included developing a single crystal piezoelectric material that would function properly at cryogenic temperatures. This R&D work continues.

Stepping Flexures was an attempt by NASA to obtain "Inch Worm" performance and small sizes using magnetic drives and flexure bending, technologies that operate at cold temperatures. This concept worked but, had its own problems. Linear Tape Motor is a redesign of Stepping Flexures that solves its limitations as well as the limitations of "Inch Worm".

Prior art for large load linear positioning devices in general use include the same technologies as listed above for space science actuators except the forces are larger, the travel distance is longer and the speeds and operating temperatures are higher. Hydraulic and air cylinders can be added as prior art also. Linear Tape Motor scales up in a straight forward manner and handles large loads reliably and safely. At moderate to slow speed it is competitive.

SUMMARY OF THE INVENTION

It is a principal object of the present invention to provide an improved means of precision positioning objects in space. It is also a principal object of the present invention to provide an improved means of moving and positioning objects for general use. It is a further object of the invention to position objects along a long stroke linear axis of travel and to hold position with power off. It is an object of the invention to produce high force and power density from compact packages and be capable of moving and securing large force objects at moderate to low speeds. It is an object of the present invention to operate efficiently and effectively at temperatures ranging from very low cryogenic to very high permanent magnet demagnetization. It is an object of the invention to perform with exceptional safety, reliability and durability. It is an object of the invention to be scalable with micro Linear Tape Motors moving and positioning small force objects in ultra cold temperatures to much larger Tape Motors moving and positioning very large force objects at room temperature and above. It is an option of the present invention to use construction methods and materials that are low cost and simple.

In accordance with the present invention, A Linear Tape Motor [1] includes a Slide, Housing, Magnetic Circuit and Controller. The Slide includes a Back Shoe, a Driver, a Front Shoe and a Tape Flexure System mutually connecting the Back Shoe, the Driver and the Front Shoe. The Payload is attached to the Front Shoe through a separate flexure. The Housing includes super permanent magnets, guide rails and electromagnetic coils to drive, guide and position the Slide and attached Payload. The Magnetic Circuit, including coils and flux paths in the Housing and Slide, uses smart electric current from the Controller to produce precision movement and positioning of the Slide. The Driver can reach the Guide Rails only by bending the Tape Flexures and when it bends the Tape Flexures, the Shoes are, forcefully, pulled together slightly and the Payload is pulled along with the Front Shoe. Bending the Tape Flexures stores potential energy in these flexures so, when the Driver is released, on command, each Flexure springs back up to its non-stressed position and the Flexures, together, force the Shoes slightly apart. By freeing one shoe and magnetically fixing the other shoe, a step direction is determined. By sequencing these motions, the Slide moves in a straight line direction along the guide rails, forwards or backwards as required. Straight line motion and reversing direction are backlash free. The Slide is stowed in power off condition with Back Shoe, Front Shoe and Driver all magnetically secured to Housing Rails and each of the Flexures bent. Straight line motion and direction reversing are backlash free.

Contact interfaces between Shoes and Rails and Driver and Rails include a Wedge included on each Shoe and on the Driver and a Trough in the Housing. This wedge in trough interface constrains Slide travel to a single, precise, rattle-free direction of travel [6].

Flexure Bending is used in novel ways to enhance Linear Tape Motor performance [ref 2. Appendix A]. Bending action of the flexures connecting Back Shoe to Driver and Front Shoe to Driver provide a mechanical advantage in driving the free Shoe and the Payload which is inversely proportional to the bending angle of each Flexure. With the small angles, this mechanical advantage is large and approaches infinity as the bending angle approaches zero. Flexure Wedges included in each Shoe and in the Driver enable the secured Shoe to react the Drive force without slipping and to utilize small angle wedge and trough angles without Shoe jamming or sticking during release.

The extreme accuracy and precision requirements of Space Telescopes require step resolutions considerably smaller than Linear Tape Motor full step resolution, so provisions are made to nano-step. Nano-Stepping is performed by measuring and adjusting the contact separation of the Driver to provide the desired Nano-Step, then fixing the Front Shoe and Payload. With the Front Shoe and Payload fixed in its Nano-Step position, the Back Shoe and Driver are returned to their power-off configuration and power can be turned off. A novel Capacitive Sensor system is embedded in the Linear Tape Motor to provide the Driver contact gap, high resolution measurements [ref.4. Appendix C]. With the addition of this capacitive sensing system and strain gauges, The Linear Tape Motor is also able to measure external force on the Payload and the holding and drive forces on each of the Slide components.

BRIEF DESCRIPTION OF THE DRAWINGS

A more complete appreciation of the invention and many of its attendant advantages will be readily appreciated as the same becomes better understood by reference to the following detailed description when considered in connection with the accompanying drawings wherein:

FIGS. 2a, 2b, 2c show sectioned views of a Linear Tape Motor to further clarify its internal construction and shows construction detail for the magnetic circuit alternate flux paths. FIG. 2b. also shows how the capacitive sensing system is integrated into the Linear Tape Motor.

FIGS. 5a, 5b illustrate flexure wedge behavior with flexure bending and gap size exaggerated for ease of understanding.

FIGS. 9a, 9b, 9c, 9d illustrate the partial step method in exaggerated and simplified form for ease of understanding.

FIG. 12 shows the block diagram of a commercially available controller capable of operating the Linear Tape Motor.

FIG. 13 shows a commercially available current driver capable of satisfying the current requirements of the Linear Tape Motor and compatible with the controller of FIG. 13.

DETAILED DESCRIPTION OF PREFERRED EMBODIMENT

Figure 3A:
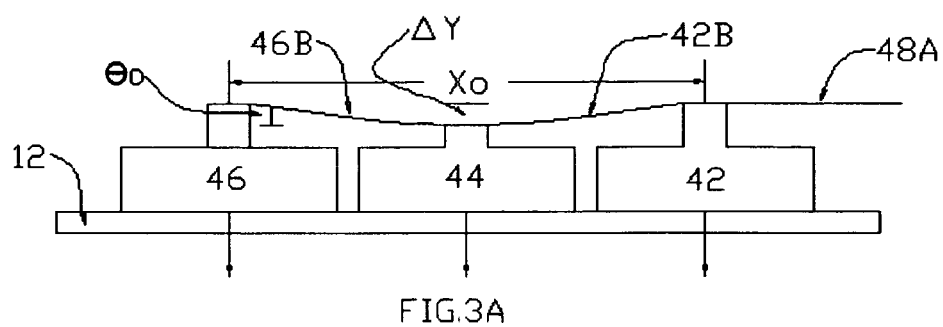
FIGS. 3a, 3b, 3c illustrate the step sequence for a single complete forward step with flexure bending, step size and gap size exaggerated for ease of understanding.
Figure 3B:
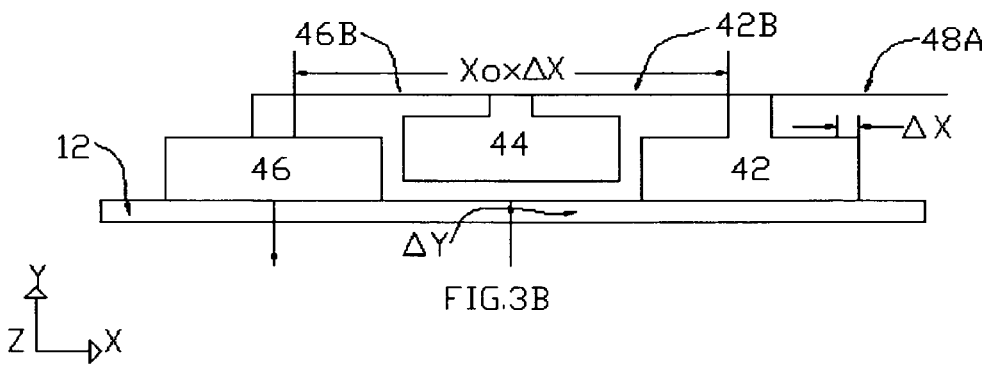
Figure 3C:
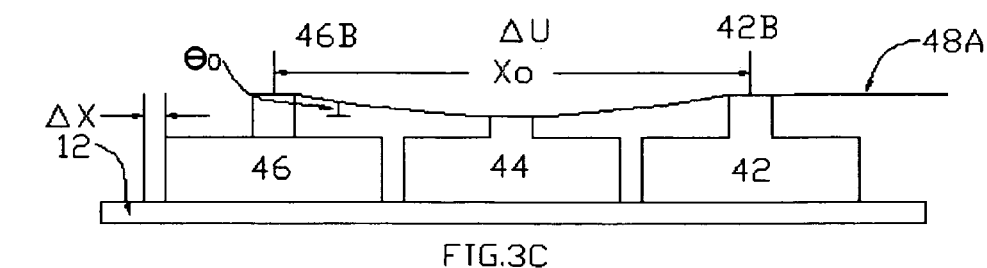
Figure 4A:
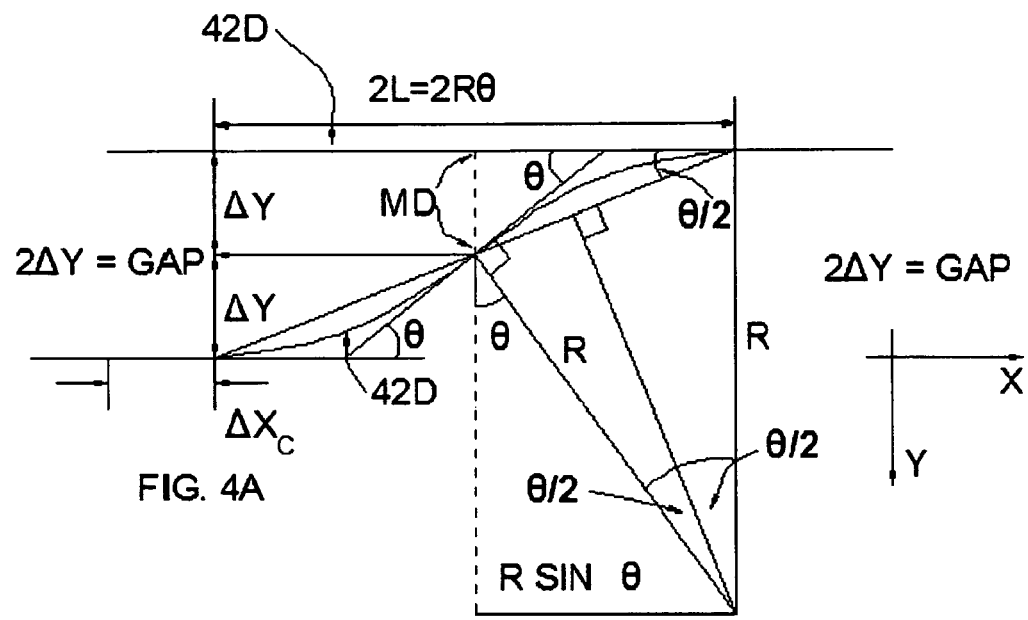
FIGS. 4a, 4b illustrate drive flexure behavior with flexure bending angle, gap size and step size exaggerated for ease of understanding.
Figure 4B:
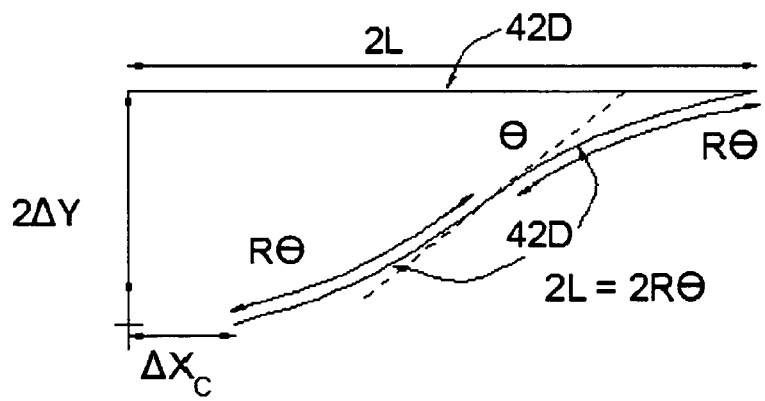
Figure 6A:
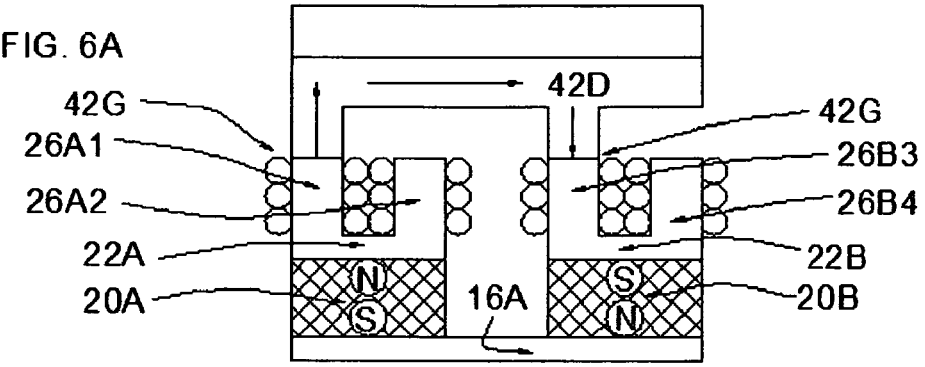
FIGS. 6a, 6b, 6c illustrate magnetic circuit alternate flux paths, presented in simplified form to introduce the basic concept.
Figure 6B:
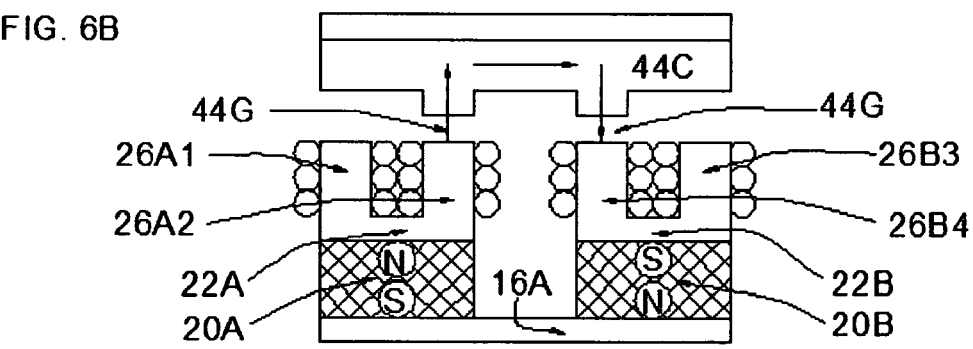
Figure 6C:
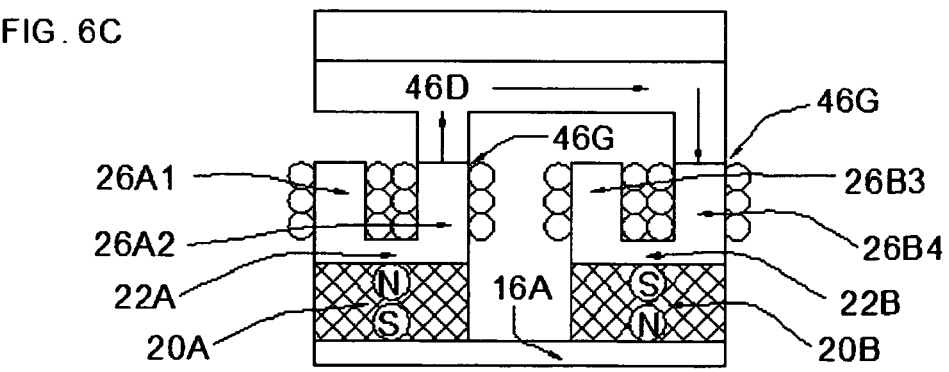

In accordance with the present invention, A Linear Tape Motor includes a Slide, Housing, Magnetic Circuit and Controller. [4]. The Slide includes a Back Shoe, a Driver, a Front Shoe and a Tape Flexure System mutually connecting the Back Shoe, the Driver and the Front Shoe. The Payload is attached to the Front Shoe through a separate flexure. The preferred embodiment of a Linear Tape Motor is configured according to FIGS. 1a, 1b, 2a, 2b, 2c and moves according to FIGS. 3a, 3b, 3c. Movement is permitted in the X direction according to FIGS. 1a, 1b, 2a, 2b, 2c, 3a, 3b, 3c and is confined in the Y and Z directions according to FIGS. 4a, 4b. Magnetic flux to power said preferred embodiment is provided and controlled according to FIGS. 6a, 6b, 6c, 7, 2a, 2b, 2c. [Detailed descriptions are found in: ref. 1 (the Linear Tape Motor system), ref. 2 (Appendix A flexure behavior and ref. 3 [(Appendix B magnetic circuit behavior)].

The invention will now be described in more detail by way of example with reference to the embodiment(s) shown in the accompanying figures. It should be kept in mind that the following described embodiments are only presented by way of example and should not be construed as necessarily limiting the inventive concept to any particular physical configuration.

Figure 1A:
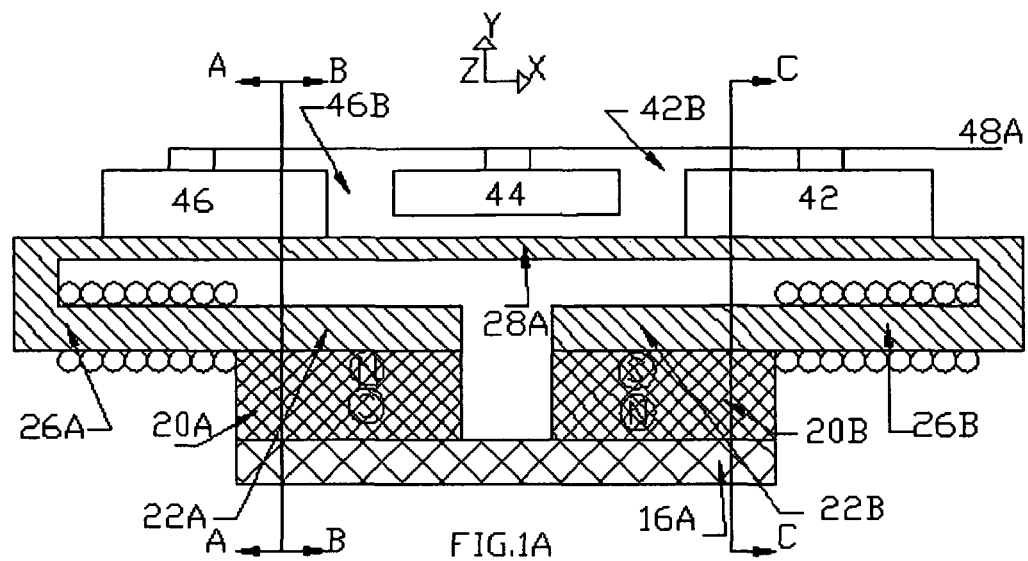
FIGS. 1a and 1b illustrate a Linear Tape Motor and use cutaways to show internal construction.
Figure 1B:
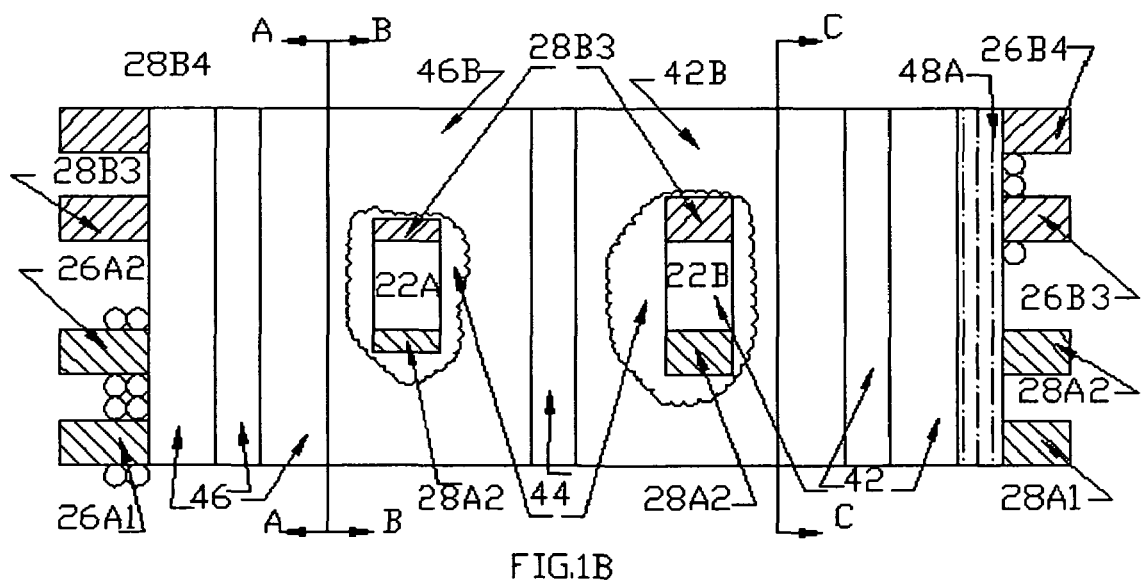

A first embodiment of a Linear Tape Motor is illustrated in FIGS. 1a, 1b, 2a, 2b, 2c, 3a, 3b, 3c. FIG. 1a illustrates an assembled Linear Tape Motor as viewed from the side, looking in the −Y direction with contact rails 12 and housing 10 structure removed for ease of understanding. Location and view direction of each required additional cross-section view are also provided. FIG. 1b shows a top view of the Linear Tape Motor with cut-away structure in drive flexures 46a and 46b to reveal underlying structure. In FIGS. 2a, 2b, 2c, the additional cross section information, called for in FIG. 1a is provided, with the additional detail of contact rails 12 and housing structure 10. FIG. 2a, cross-section A-A, illustrates cross-section detail of the back shoe 46 within the housing 10 as per FIGS. 1a, 1b. This cross-section view shows that physical contact between back shoe 46 and housing 10 involves contact between the sole 46c1 of each wedge flexure 46c and its corresponding contact rail portion 12 of the housing 10. Cross-section A-A also shows the relative positions of drive flexure 46b, wedge flexures 46c and the mobile portion 46d of the magnetic circuit for back shoe 46. The C-C cross-section view of FIG. 2c shows that physical contact between front shoe 42 and housing 10 involves contact between the sole 42c1 of each wedge flexure 42c and its corresponding contact rail portion 12 of the housing 10. Cross-section C-C also shows the relative positions of drive flexure 42b, wedge flexures 42c and the mobile portion 42d of the magnetic circuit for front shoe 42. Cross-section B-B of FIG. 2b illustrates cross-section detail of the driver 44 within the housing 10 and shows that the physical contact between driver 44 and housing 10 involves contact between the sole 44b1 of each wedge flexure 44b and its corresponding contact rail portion 12 of the housing 10. Cross-section B-B also shows the relative positions of drive flexure 46b, wedge flexures 44b and the mobile portion 44c of the magnetic circuit for driver 44. When the drive flexures are not sprung, a gap opens between 44b1 and 12 and the gap disappears when the driver is pulled down and the drive flexures bent as per 44 in FIG. 3a. and FIG. 3b. As per FIGS. 5a, 5b, wedge flexures, 42c, 44b, 46c mating contact surfaces, 12, constrain the tape slide 40 in all directions except the linear X direction of travel. Back shoe 46 and front shoe 42 are in constant contact with contact rails 10 and driver 44 has a gap that varies from contact to drive flexures 42b, 46b not sprung. This gap varies on command. The magnetic force on the back shoe 46 and front shoe 42 also vary on command so the tape slide 40 can move as per FIGS. 3a, 3b, 3c. [Ref. 2. Appendix A provides detail on the drive flexures.]

The magnetic circuits that drive tape slide 40 are illustrated in FIGS. 6a, 6b, 6c, 7, 2a, 2b, 2c, 8a, 8b, 8c. According to FIGS. 6a, 6b, 6c, magnetic flux from the north pole of permanent magnet 20a travels to the south pole of permanent magnet 20b through any of three (3) alternate paths 26a1 to 46d to 26b3, 26a2 to 42d to 26b4, 26a2 to 44c to 26b3. According to FIGS. 2a, 2b, 2c, the preferred embodiment is constructed to provide the three (3) alternate paths. A portion of each of these three (3) alternate paths contains magnetic coils to control the magnetic flux through that path. According to FIGS. 7, 26a1, 26a2, 26b3, 26b4 contain magnetic coils and 46d, 42d, 44c are passive (no magnetic coils). According to FIGS. 1a, 1b and 6a, 6b, 6c, the tape motor is more compact and the magnetic force transmission rails extend the length of the motor when the magnetic flux paths are modified to 26a1 to 28a1 to 46d to 28b3 to 26b3, 26a2 to 28b2 to 42d to 28b4 to 26b4, 26a2 to 28a2 to 44c to 28b3 to 26b3, with 28a1, 28b3, 28b4, 28a2 extending the length of the tape motor. The passive entities 46d, 44c, 42d are mobile and the other portions are fixed to the housing 10. A deliberate air gap is left between each mobile entity and the remainder of its magnetic flux path: 46g for back shoe 46, 44g for driver 44 and 42g for front shoe 42. These air gaps ensure that physical contact occurs at the wedge flexures and that magnetic flux and magnetic force from the permanent magnets is distributed between the driver and shoes when electrical power in the magnetic coils is off. These air gaps can be individually sized for optimum linear tape motor performance, including storing the driver 44 in the down position with electrical power off as per FIG. 3a. Air gaps 46g, 44g remain fixed as tape slide 40 travels but, air gaps 44g vary between a minimum set value, when the driver 44 is in contact with rails 12, and a maximum set value when drive flexures 46b, 42b are straight (no bending). [ref. 3 Appendix B provides detail on the magnetic circuits.]

Drive flexure behavior is illustrated in FIGS. 3a, 3b, 3c, 4a, 4b and described in detail in ref. 2. Appendix A. When driver 44 moves closer to contact rails 12, drive flexures 46b and 42b, each bend more. As drive flexures bend more, shoes 46 and 42 are pulled towards each other. When driver 44 moves away from contact rails 12, drive flexures 46b and 42b each unbend and push 46 and 42 apart. Securing one shoe and freeing the other shoe, while drive flexures 46 and 42 are being bent and unbent, results in tape slide 40 motion. Preferred embodiment drive flexures 46b and 42b are identical and step size is determined by eq. 1 [ref.1]

[Appendix A]

$$4L\left(1 - \frac{\sin\theta_G}{\theta_G}\right) = \Delta X_G \text{ (step size for both flexures)}. \quad \text{(eq. 1,)}$$

Where drive flexure bending angle is determined by eq.2 [ref 1] as a function of drive flexure 46b, 42b length and driver 44 distance from its unbent flexure 46b, 42b position.

[Appendix A]

$$\Delta Y_G\left(\frac{3}{2L}\right) = \tan\theta_G \quad \text{(eq. 2)}$$

Ref. 2 Appendix A is attached as part of this patent application and provides supporting explanation and derivations for eq. 1 and eq.2.

Because of the small bending angles involved, the free shoe is driven (forward or backward) with mechanical advantage. That is, the drive force on the free shoe is greater in magnitude than the magnetic force pulling the driver 44 down and the spring return force returning the driver 44 back up. The mechanical advantage as a function of drive flexure 46b, 42b bending angle θ is given by:

[Appendix A]

$$MA(\theta) = \frac{\theta(1 + (\tan\theta)^2)}{3\left(\frac{\sin\theta}{\theta} - \cos\theta\right)} \approx \frac{\theta}{3\left(\frac{\sin\theta}{\theta} - \cos\theta\right)} \quad \text{(eq. 3)}$$

Using L'Hopital's Rule to determine MA(θ) at θ=0:

[Appendix A]

$$\frac{d(num)/d\theta}{d(denom)/d\theta}\bigg|_{(\theta=0)} = \frac{2(1+(\tan\theta)^2+\theta\tan\theta(1+(\tan\theta)^2)}{3\sin\theta} = \infty \quad \text{(eq. 4)}$$

The free shoe drive force is the product of the force on the driver 44 (either magnetic pulling it down or flexure 46b, 42b spring return moving it back up). Relatively large magnetic forces on driver 44, combined with a large minimum mechanical advantage provides a large minimum free shoe drive force with adequate spring return force in the bent flexures 46d, 42d. Adequate free shoe drive force during spring return is less straight forward. During flexure 46b, 42b spring return, the spring force becomes less as the bending angle θ becomes less but, the mechanical advantage MA(θ) becomes more. Comparing free drive shoe forces for any two (2) bending angles results in:

$$\tan\theta_1 \cdot MA(\theta_1) \approx \tan\theta_2 \cdot MA(\theta_2) \quad \text{(eq. 5) [Appendix A]}$$

Ref. 2 Appendix A also shows how free shoe drive force is, essentially, unchanged between 0.5° and 2.4° after which driver 44 upward momentum should take the driver 44 to 0°. Thus, free shoe drive force will be strong throughout flexure spring return.

Flexure Wedge (42c, 44b, 46c) behavior is illustrated in FIGS. 5a, 5b and its behavior and performance are described in detail in ref.[2]Appendix A. The Linear Tape Motor preferred embodiment requires wedge-shaped guide rails 12 to prevent the Tape Slide 40 from wandering from its travel axis while moving along that travel axis. At the same time, plant shoe 46, 42 slipping limits Tape Motor performance, which, in turn, suggests the wedges would work better with high friction contact surfaces in conjunction with small wedge angles 14. But, small angle wedges 14 with high friction contact surfaces invite jamming and failure. Flexure Wedges 42c, 44b, 46c (flexible in bending but, stiff along their friction hold axis) provide a "work around". Flexure Wedges 42c, 44b, 46c are jam proof and can be reliably and efficiently extracted with minimal force. Flexure wedges 42c, 44b, 46c can, also, be more efficiently inserted than solid wedges. Nearly all of the insertion force goes into friction hold normal forces and very little goes into overcoming sliding. A first order analysis shows that flexure wedges perform with efficiencies close to ideal. The bending of flexure wedges is very small, compared to drive flexures 46b, 42b. They only need to bend enough to break surface coulomb forces, jump over surface roughness micro-bumps and/or push its' contact shoe microscopically into the contact surface to generate micro strain and large normal force. Typically 0.1° or 0.2°. is all that is required. Such small bending angles can be achieved with small flexure lengths L with 2L=⅛ in proving sufficient. Small feet on the ends of the flexures (as shown in FIGS. 5a, 5b) reduce contact stresses and compression strains and minimize bending angles.

Magnetic circuit behavior will now be described. The magnetic circuit is conceptually illustrated in FIGS. 6a, 6b, 6c, 7, 8a, 8b, 8c and described in detail in ref. 3, Appendix B. Details in its physical construction for the preferred embodiment are shown in FIGS. 1a, 1b, 2a, 2b, 2c, 8a, 8b, 8c. According to FIGS. 6a, 6b, 6c, magnetic flux from the north pole of permanent magnet 20a travels to the south pole of permanent magnet 20b via any combination of flux paths: 26a1 to 42d to 26b3, 26a2 to 44c to 26b3, 26a2 to 46d to 26b4. The flux transfer rails 26a1, 26a2, 26b3, 26b4, extend the length of the Linear Tape Motor housing 10 so mobile keepers 42d, 44c and 46d have access to magnetic flux throughout their length of travel. Electromagnet coils 26a1, 26a2, 26b3 and 26b4 are included in their flux paths to enable the magnetic flux passing through each of these paths to be electrically controlled on command. FIGS. 1a, 1b, 8a, 8b, 8c show how 28a1 is folded over top of 26a1 to enable magnetic flux to be provided the length of the Linear Tape Motor housing 10 with a flux control electromagnet in control of the amount of flux that passes through it. Similarly, 28a2 is folded over top of 26a2, 2863 is folded over the top of 26b3 and 28b4 is folded over top of 26b4 for the same reasons. FIGS. 2a, 2b, 2c show how the magnetic circuit elements fit with the mechanical portions from the cross section point of view. Three (3) cases are of most interest. In Case 1, the back shoe 46 is planted, the front shoe 42 is freed and the driver 44 is freed to spring up and push the front shoe 42 forwards. In Case 2, the back shoe 46 is planted, the front shoe 42 is freed and the driver 44 is pulled downwards to pull the front shoe 42 backwards. In Case 3, power is off and the driver 44 is in the down position. Magnetic flux is going across all three air gaps and through all three keepers 42d, 44c and 46d. Permanent magnet flux holds each of the keepers 46d, 44c and 46d against its' rails 12 and provides the friction forces that hold the payload in place during power-off conditions.

Case 1

Case 1 is the worst case because all the permanent magnet flux must be forced through a single path. This requires high performance soft magnetic material that will not saturate and requires the largest NI sufficient to drive the additional magnetic flux across the air gap without changing $V_{Pm}$. [Eqs. 6, 7, 8 are explained in ref. 3, Appendix B.]

Permanent magnet $\phi_{pm}=B_{max}S$.

All the flux is going through the back shoe 46 air gap.

$$V_{pm} + 2N_S I_{SB} = \phi_{pm} R_{air} = \frac{B_{max} d}{\mu_0} \quad \text{(eq. 6)}$$

This requires 2.65 amps in electromagnetic assistance.
Zero flux is going through the front shoe 42 air gap.

$$V_{pm} - N_S I_{SF} = 0 \quad \text{(eq. 7)}$$

This requires 1.33 amps in electromagnetic blocking
Zero flux is going through the driver 44 air gap.

$$V_{pm} - N_D I_D = 0 \quad \text{(eq. 8)}$$

This also requires 1.33 amps in electromagnetic opposition. The power supply requirement is, then, 5.31 amps. These are reasonable numbers.

Case 2

In Case 2, the back shoe 46 is planted, the driver 44 is being driven downwards and the front shoe 42 is free to move. The available permanent magnet flux is equally distributed between the back shoe 46 and the driver 44. The permanent magnet magneto-motive force $V_{pm}$ is unchanged by energizing electric coils 26a2, 26b4 to assist the permanent magnet flux until half the flux is going through the back shoe 46 air gap. [Eqs. 9, 10, 11 are explained in ref. 3, Appendix B.]

$$V_{pm} + N_S I_{SB} = \left(\frac{1}{2}\right)\phi_{pm} R_{air} = \frac{B_{max} d}{2\mu_0} \quad \text{(eq. 9)}$$

Zero flux is going through the front shoe 42 air gap because electric coils 26a1, 26b3 are energized to oppose the permanent magnet flux.

$$V_{pm} - N_S I_{SF} = 0 \quad \text{(eq. 10)}$$

This requires 1.99 amps in electromagnetic opposition.
Half the flux is going through the driver 44 air gap.

$$V_{pm} + N_D I_D = \frac{1}{2} \phi_{pm} R_{air} = \frac{B_{max} d}{2\mu_0}, \quad I_D \text{ starts at } 3.5 \, I_{SB} \quad \text{(eq. 11)}$$

$I_D$ starts at $3.5 \, I_{SB}$ then reduces to $I_{SB}$ as flux gap reduces to $d$ This requires a peak 5.64 amps in electromagnetic assistance. The power supply requirement is 7.63 amps. These are reasonable numbers.

Case 3

In Case 3, power is off and the driver 44 is in the down position. Magnetic flux is going across all three air gaps and through all three keepers 42d, 44c and 46d. Permanent magnet magneto-motive force holds each of the keepers against its' rails 12 and provides the friction forces that hold the payload in place during power-off conditions. No external power is required. [Eqs. 12, 13, 14 are explained in ref. 3, Appendix B.]

$$V_{pm} = \frac{B_{SB} d_{SB}}{\mu_0} = \frac{B_{SF} d_{SF}}{\mu_0} = \frac{B_D d_D}{\mu_0}, \text{ all } NI = 0 \quad \text{(eq. 12)}$$

Where:

$$\phi_{pm} = B_{SB} S_{SB} + B_{SF} S_{SF} + B_D S_D \quad \text{(eq. 13)}$$

And:

$$V_{pm} = \frac{B_{max} d}{3\mu_0} = \frac{B_{max} d}{3\mu_0} = \frac{B_{max} d}{3\mu_0}, \quad \text{(eq. 14)}$$

all $d$ and $S$ same, all $NI = 0$

Magnetic Circuit Forces. [Ref. 3, Appendix B]

The forces in the magnetic circuit will now be estimated using highlights from ref. 3, Appendix B. The equation numbers are those of Appendix B but, are numbered for this discussion.

For this example, we choose permanent magnets with 24 lbf available force specified. This force relates to a magnetic flux φ and magnetic flux density B associated with an area S such that φ=BS as per eq. 13. [Eqs. 15, 16, 17, 18 are explained in ref. 2, Appendix B.]

$$F_{pm} = 24 \text{ lbf.} = \frac{B_{pm}^2 S}{2\mu_0} \quad \text{(eq. 15)}$$

Driving magnetic flux across an air gap requires the magnetic circuit to provide a magneto-motive force as per eq. 16. In eq. 14 the power off magnetic flux distribution is shown with the magneto-motive force from the permanent magnets unchanged.

$$V_{PM} = \phi_B \frac{d}{\mu_0 S} \text{(Back Shoe)} \quad \text{(eq. 16)}$$

$$= \phi_D \frac{d}{\mu_0 S} \text{(Driver)}$$

$$= \phi_F \frac{d}{\mu_0 S} \text{(Front Shoe)}$$

Figure 7:
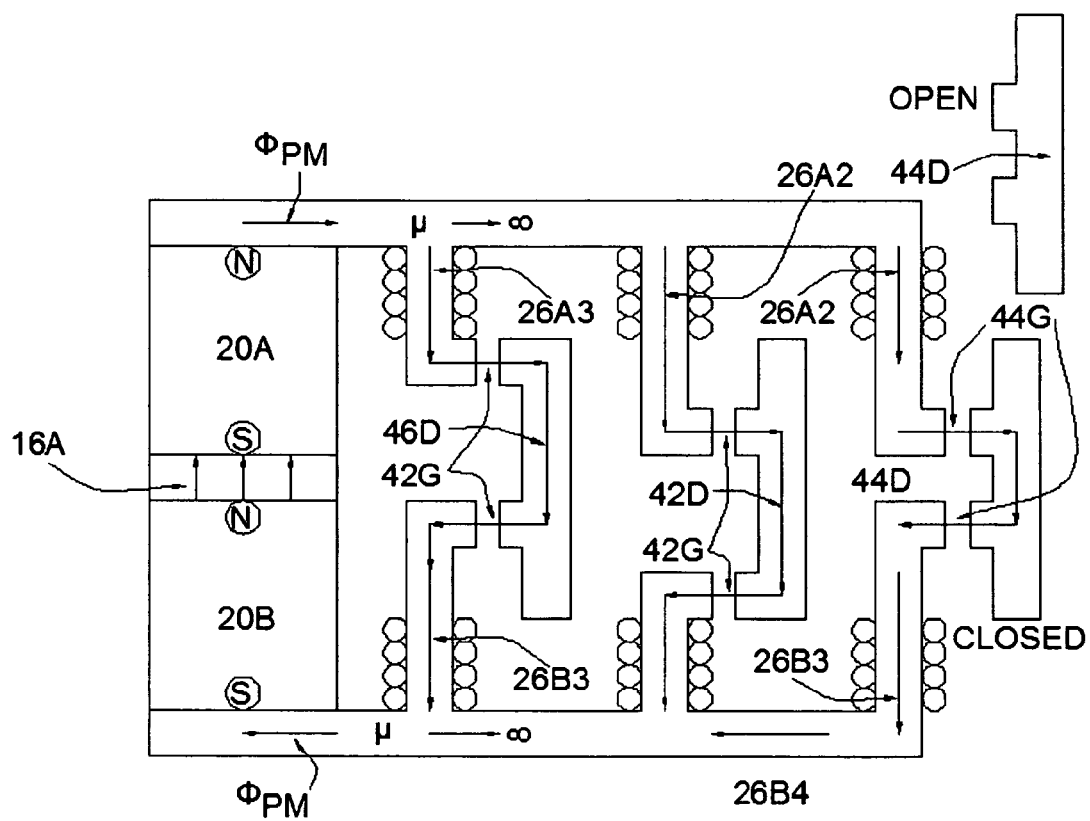
FIG. 7 illustrates the electromagnetic switching system including the magnetic circuit alternate flux paths. It is presented in exaggerated and simplified form for ease of understanding.
Figure 8A:
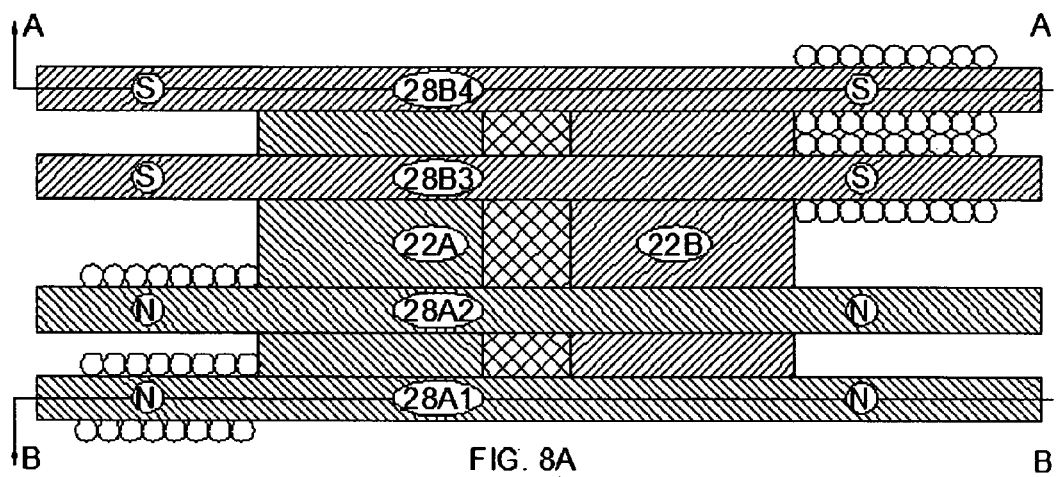
FIGS. 8a, 8b, 8c illustrate the construction concept of that portion of the magnetic circuit flux paths within the housing.
Figure 8B:
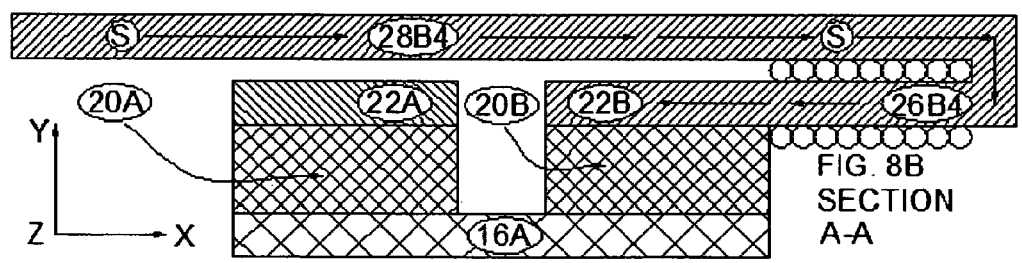
Figure 8C:
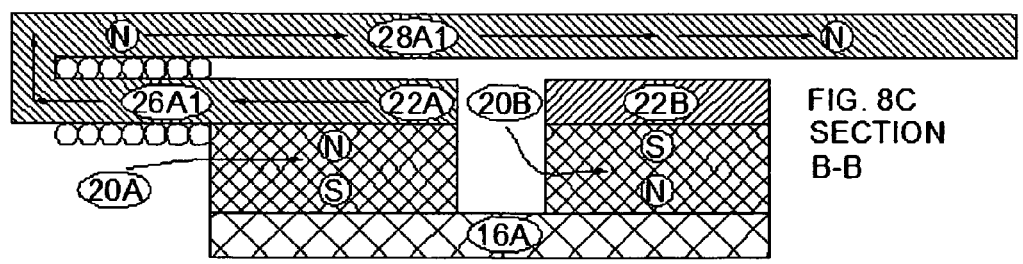

The total magnetic flux from the permanent magnet is conserved as per (eq. 17) but, its distribution is affected by the electro-magnetic switching circuit (FIG. 7).

$$\phi_{PM} = \phi_B + \phi_D + \phi_F \quad \text{(eq. 17)}$$

Changing flux distribution, changes the amount of flux and flux density across each air gap. While the change in flux is linear, the change in magnetic force is proportional to the square of the flux density as per (eq. 18). Total magnetic force is not conserved. It varies according to each situation.

$$\frac{F}{F_{pm}} = \left(\frac{B}{B_{pm}}\right)^2 = \frac{F}{24 \text{ lbf}} \quad \text{(eq. 18)}$$

In the example prototype, the back shoe 46, driver 44 and front shoe 42 all have the same air gap and gap cross sectional area so, the forces across each can be determined by comparing the squares of their relative flux densities, B. Total magnetic force is not conserved even though total magnetic flux $\phi_{pm}$ is conserved.

Prototype Performance Estimates

A prototype example will be examined to gauge expected Linear Tape Motor performance. The back shoe 46, driver 44 and front shoe 42 are chosen to be 0.5 in. long and the drive flexures connecting them 46b and 42b are each 0.5 in. long. The driver 44 travel gap is nominally 0.010 in. [Eqs. P1, P2, P3, P4, eq. 9, P5, P6, P7, P8 are explained in ref. 2, Appendix A.]

$$\tan^{-1}(0.010 \cdot 3/(2 \cdot 0.5)) = \theta_C = 1.7183580016555° \quad \text{(P1.)}$$

With a step size of $$(1 - \sin 1.7183580016555/(((1.7183580016555 \cdot 2\pi)/360) = 0.0001499033203 \text{ in.} \quad \text{(P2)}$$

Or $$3.8075519507239 \cdot 10^{-6} \text{ meters} \quad \text{(P3)}$$

Using a controller step frequency of 20 khz moves the Tape Slide at $$20 \cdot 10^3 \cdot (\tfrac{1}{2}) \cdot 0.0001499033203 \text{ in.} = 1.499033203 \text{ in./sec} \quad \text{(P 4)}$$

$$MA(\theta) = \frac{\theta(1 + (\tan\theta)^2)}{3\left(\frac{\sin\theta}{\theta} - \cos\theta\right)} \approx \frac{\theta}{3\left(\frac{\sin\theta}{\theta} - \cos\theta\right)} \quad \text{(eq. 19)}$$

At 2 degrees bending angle, MA(θ)
= 28.686319905236 (P5)

At 1 degree bending angle, MA(θ)=57.314982245648 (P6)

At 0.5 degrees bending angle, MA(θ)
= 114.601158852177 (P7)

In a worst case condition, flexure drive mechanical advantage>28.68 to 1. (P8)

How Much Drive Force would this Prototype Produce?

NdFeB super permanent magnets provide 24 lbf pulling force from a 1.0 in by 0.5 in by 0.25 in magnet according to product specs. [ref. 2 Appendix B] In the prototype, two (2) sets would be used to supply adequate holding force and be small enough to fit into the nominal 1 in by 1 in. by 2 in actuator size desired with a 0.5 in stroke length. [Eqs. P9, P10, P11, P12, P13 are explained in ref. 3, Appendix B.]

$$\frac{F}{F_{pm}} = \left(\frac{B}{B_{pm}}\right)^2 = \frac{F}{24 \text{ lbf}} \quad (P9)$$

Case 1. Driving the payload 48*a* backwards using spring return force on the driver 44. In this case, all magnetic flux is directed to the back shoe 46 because the driver 44 and springs 42*b*, 46*b* must be free to return and because the front Shoe 42 must be free to slide. In this case, we have:

$$\phi_B = \phi_{PM} \text{ and } B_B = B_{PM}$$

And from eq. 9

$$F_B = F_{PM}(24 \text{ lbf for our example})$$

$$F_F = 0$$

$$F_D = 0 \quad (P10)$$

(There is a spring 42*b*, 46*b* return force on the driver 44 but, no magnetic force.)

Case 2. Driving the Payload forward using magnetic force on the Driver. We assume the permanent magnet flux is equally distributed between the Back Shoe and the Driver.

$$\phi_B = \phi_D = \frac{\phi_{PM}}{2}; B_B = B_D = \frac{B_{PM}}{2}$$

$$\phi_F = 0; B_F = 0$$

And from eq.9.

$$F_B = F_D = \frac{F_{PM}}{2^2} \text{ (6 lbf for our example)} \quad (P11)$$

$$F_F = 0$$

Case 3. Resting the system with power off and the Driver down.

$$\phi_B = \phi_D = \phi_F = \frac{\phi_{PM}}{3}; B_B = B_D = B_F = \frac{B_{PM}}{3} \quad (P12)$$

$$F_B = F_D = F_F = \frac{F_{PM}}{3^2} \left(\frac{8}{3} \text{ lbf for our example}\right)$$

Cases 1 and 2 have mirror Cases in which the Front shoe is planted rather than the Back Shoe but, the relationships and values are unchanged.

Choosing drive flexure 46*d*, 42*d* spring stiffness to provide 2 lbf force at 0.010 deflection enables the 8/3 lbf available power off magnetic force to hold the driver 42 down during actuator rest and still drive it with 21 lbf·28.68=57.36 lbf.

Prototype drive would be >57.36 lbf. (P13)

Flexure Wedge Hold Forces.

The hypothetical prototype will be examined as a means of answering this question.

Forces Reacted by Flexure Wedge Insertion.

For flexure wedges 42*c*, 46*c*, 44*b*

$$\Sigma F_Y = 0 \quad (\text{eq. 20})$$
$$2F_N \sin\theta + 2P = F_I$$

$$F_N = \left[2L\left(\frac{\phi}{2}\right)\sin\theta - 2L\left(1 - \frac{\sin\phi}{\phi}\right)\right]\frac{AE}{2L} \quad (\text{eq. 21})$$

$$F_N = \left[\left(\frac{\phi}{2}\right)\sin\theta - \left(1 - \frac{\sin\phi}{\phi}\right)\right]AE (\text{by simplification}) \quad (\text{eq. 22})$$

$$P\cos\theta = \frac{2EI\tan\phi}{L^2} \quad (\text{eq. 23})$$

$$\frac{2F_N}{F_I} = GMA (\text{geometric mechanical advantage}) \quad (\text{eq. 24})$$

$$GMA \cdot \mu_S = FFMA (\text{friction force mechanical advantage}) \quad (\text{eq. 25})]$$

Choose:

θ=10°

L=1/16 in. (half of total flexure bending length.)

φ=0.025°

Flexures are 0.010 in. thick and 0.5 in. wide

Flexure contact shoes are 0.060 in. wide and 0.5 in. long (minimum for low contact pressure.)

Spring Steel is the Flexure material E=30 (E6) psi in/in.

Contact surfaces are nickel on nickel with $\mu_s$=0.7

[Derivations for eq. 20, eq. 21, eq. 22, eq. 23, eq. 24, eq. 25 are found in ref. 2 Appendix A. Specifications for example prototype, immediately above, are also found in ref. 2, Appendix A.]

Strain per Flexure is given as:

$$\left(\frac{\frac{0.025\pi}{720} \cdot \sin 10 -}{\left(1 - \frac{\sin 0.025}{0.025 \cdot \pi/360}\right)}\right) = 3.785242523811(E-5)\text{in} \quad (P14)$$

$$3.78524252381\frac{E-5}{\frac{1}{8}}\frac{\text{in}}{\text{in}} = 0.0003028194019\frac{\text{in}}{\text{in}} = E \quad (P15)$$

Two (2) flexure wedges are used

This results in $$2F_N=90.845818857144 \text{ lbf} \quad (P16)$$

as per:

0.0003028194019·30(E6)·0.01·0.5·2=90.845818857144 lbf

By rearranging eq. 23, the required bending force P is given as:

$$P = \frac{2EI\tan\phi}{\cos\theta \cdot L^2} \quad (\text{eq. 26})$$

So:

$$P = \left(2 \cdot 30(E6) \cdot \left(\frac{1}{12}\right)0.5 \cdot (0.01)^3 \cdot \tan 0.025\right) \bigg/ \left(\cos 10 \cdot \left(\frac{1}{16}\right)^2\right) \quad \text{(P17)}$$
$$= 0.1417803105159 \text{ lbf}$$

And:

$$\frac{(2F_N)}{(2F_N \sin 10 + 2P)} = GMA = 5.6570839666419 \quad \text{(P18)}$$

Resulting in:

$$GMA \cdot \mu_S = FFMA \text{ (friction force mechanical advantage)} \quad \text{(P19)}$$

$$5.6570839666419 \cdot 0.7 = 3.9599587766493 \, FFMA \quad \text{(P20)}$$

$$3.9599587766493 \cdot \frac{8}{3} \cdot 2 = 21.1197801421296 \text{ lbf} \quad \text{(P21)}$$

$$3.9599587766493 \cdot 6 = 23.7597526598958 \text{ lbf} \quad \text{(P22)}$$

By comparison:

$$\frac{1}{\sin 10} = 5.7587704831436 = GMA(\text{Ideal}) \quad \text{(P23)}$$

$$\frac{GMA}{GMA(\text{ideal})} = \frac{5.6570839666419}{5.7587704831436} \cdot 100 \quad \text{(P24)}$$
$$= 98.2342321716181\%$$

So:
Two (2) shoes hold with a total of 21.12 lbf with power off
One (1) shoe holds with 23.76 lbf powered worst case.
Minimum drive force would be 57.36 lbf and minimum powered holding force is 23.76 lbf so Tape Motor performance will be limited by the hold shoe slipping while the Tape Motor is driving the payload. Flexure wedges, with steep angles, help but, there are still limitations.

Extracting Flexure Wedges.

The first step in a successful extraction is to limit the residual forces that need to be overcome in extraction. The next step is to use leveraged extraction to overcome what residual forces remain.

Limiting Residual Forces

Flexure wedges 42c, 46c, 44b limit residual forces in small angle wedge contacts 12. Solid wedges must slide at the contacts to generate the forces needed to counter the insertion forces. These contact forces include large friction forces, which oppose the extraction of the solid wedge, once the insertion force is removed. With high friction contact surfaces and small angle wedge contacts 12, θ, the normal forces are unable to push the solid wedge back out and the residual contact forces remain. With flexure wedges 42c, 46c, 44b, normal contact forces opposing insertion are mainly created by bending, with minimal sliding. The bending method is more efficient than sliding so the requisite normal forces are built up with very little sliding. When insertion force goes to zero, the flexure wedges bend back and relieve the residual normal forces, leaving only the small, micro-slide residual forces. Flexure spring 46c, 42c, 44b return bounce may eliminate these micro-slide residual forces. [Eqs. P25, P26, P27 are explained in ref. 1, Invention Disclosure and ref. 2, Appendix A, ref. 3, Appendix B.]

The example prototype shows:

$$\frac{(2F_N)}{(2F_N \sin 10 + 2P)} = GMA = 5.6570839666419 \quad \text{(P25)}$$

With lossless ideal being:

$$\frac{1}{\sin 10} = 5.7587704831436 = GMA(\text{Ideal}) \quad \text{(P26)}$$

And an efficiency of:

$$\frac{GMA}{GMA(\text{ideal})} = \frac{5.6570839666419}{5.7587704831436} \cdot 100 \quad \text{(P27)}$$
$$= 98.2342321716181\%$$

This leaves a residual force on the order of 29% and should make extraction easy.

Leveraged Extraction

Flexure wedges use bending, rather than sliding, to break contact and this is done with the same mechanical advantage as insertion. Consequently, extraction should be nearly effortless and hardware experience confirms this.

The example prototype GMA=5.6570839666419 means prototype extraction forces are operating against minimal residual forces with great leverage. The prototype should not have an extraction problem.

Jamming Resistance

The efficiency with which flexure wedges 42c, 46c, 44b apply force during insertion and the efficiency and mechanical advantage with which they relieve residual force and break contact during extraction suggest they would not be adversely affected by impact jamming forces. Impact forces also cause a bounce back which, in turn, eliminates micro-residual sliding forces. Hardware experience confirms that impact forces do not appear to effect flexure wedges.

The prototype would be immune to any reasonable impact jamming.

Nano Stepping (FIGS. 9a, 9b, 9c, 11, 2a, 2b, 2c and Ref. 4 Appendix C)

The Linear Tape Motor full step is orders of magnitude too large for NASA precision position requirements so, nano-stepping must be applied (FIGS. 9a, 9b, 9c). To move a nano distance forwards, initial conditions have driver 44, back shoe 46 and front shoe 42 in contact with contact rails 12. Back shoe 46 is, then, forced firmly against contact rails 12 and front shoe 42 is freed but, remains in contact with contact rails 12. Driver 44 is, then moved fractionally away from contact rails 12, whereby front shoe 42 and payload 48a slide slightly forwards. The font shoe 42 is forced firmly against contact rails 12, back shoe 46 is freed and driver 44 is, then, moved to contact rails 12. Power can, then, be turned off with a single forwards nano step completed. To move a nano distance backwards, initially, driver 44, back shoe 46 and front shoe 42 are in contact with contact rails 12. Front shoe 42 is forced firmly against contact rails 12 and back shoe 46 is freed but, remains in contact with contact rails 12. Driver 44 is, then, moved fractionally away from contact rails 12, whereby back shoe 46 slides slightly backwards. Back shoe 46 is, then, forced firmly against contact rails 12, followed by freeing front shoe 42. The driver 44 is, then, pulled back against contact rails 12 pulling front shoe 42 and payload 48a slightly backwards. At this point, power can be turned off with a single backwards nano step completed.

Figure 10:
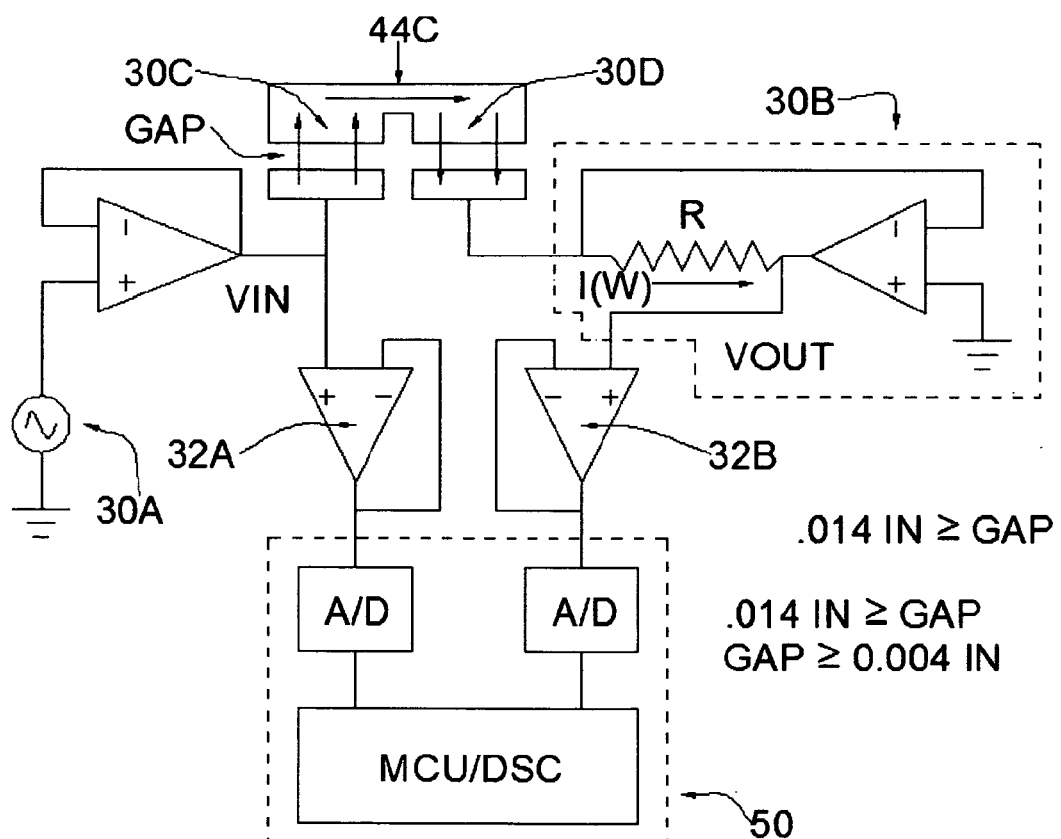
FIG. 10 is a simplified schematic to illustrate the partial step capacitive sensing concept.

The ability to measure (FIGS. 10, 11, 12) and control the separation of the driver 44 from contact rails 12 is critical to nano stepping A capacitive measuring system 30 (FIGS. 9a, 9b, 9c) using a novel driven ground (30b) feature [ref. 5] can satisfy the measurement precision requirements and can coexist and function with the electromagnetic power and control system.

The position precision and step fineness are determined by how precisely the driver 44 to rail 12 separation can be measured and controlled (FIGS. 9a, 9b, 9c, 10, 11, 12, 13), while ref. 4, Appendix C addresses separation measurement and resultant nano-step performance in more detail.

A. Nano-Stepping Requirements

1. NASA Requirements [Ref. 1, Invention Disclosure]

The NASA James Webb Space Telescope project set requirements for a long stroke precision actuator to position its telescope mirrors. These requirements are used in this patent application as typical of high performance science instrument precision positioning. NASA required a long stroke (6 mm≈0.25 in.) with a step precision of $6 \cdot 10^{-9}$ meters. The author (jmv) does not recall the force capabilities but, 5 lbf seems reasonable, if conservative, number given its primary mission of positioning low mass telescope optics components in micro gravity. The system must be able to operate at 30° K and in a vacuum. Appendix C will concentrate on meeting the $6 \cdot 10^{-9}$ meter precision requirement.

2. Sensor Derived Requirements [Ref. 4, Appendix C]

Working through the requirements of the example Linear Tape Motor provides guidance for the sensing system specific requirements. We recall that a full step is on the order of: 0.0001499033203 in. or $3.8075519507239 \cdot 10^{-6}$ meters. This too large for nano-stepping by a factor of:

$$3.8075519507239 \cdot 10^{-6} \, m / 6 \cdot 10^{-9}$$
$$m = 634.591991787317 \text{ times too large} \quad (P28)$$

As per FIG. 8, it can be seen that partial steps are feasible and that the step resolution of these partial steps depends on knowing the separation between the driver 44 and its contact rails 12. We choose a capacitive measurement system (FIGS. 9a, 9b, 9c, 10, 11) to measure this separation. The measurement burden is eased by the mechanical advantage of the Tape Flexures. By Conservation of Energy we know that a large mechanical advantage means that the driver 44 must move much further than the nano step size output and this makes it easier to precisely and accurately measure its position.

$$\Delta d \approx MA \cdot \Delta S = MA \cdot 6(E-9) m (\text{in our case}) \quad (P29)$$

In its worse case (contact with the Rails), the mechanical advantage is 23.8697473281534 [3] which means the Sensor System must resolve a separation distance from the rails 12 of $$23.8697473281534 \cdot 6 \cdot 10^{-9} \, m \cdot 39.37$$
$$\text{in} / m = 5.6385117138564 \cdot 10^{-6} \, \text{in.} \quad (P30)$$

This is, still, a very tiny separation distance and will challenge the capabilities of our capacitive sensor system 30. We look to an alternate strategy, perhaps nano-stepping from the base line position where the driver 44 is sprung fully up. In this circumstance, the mechanical advantage is much larger, 114.601158852177 [4] and the capacitive measurement system must discriminate a driver 44 separation distance between fully separated from the rails and nearly fully separated of $$114.601158852177 \cdot 6 \cdot 10^{-9} \, m \cdot 39.37$$
$$\text{in} / m = 2.7071085744061 \cdot 10^{-5} \, \text{in} \quad (P31)$$

This alternative measurement approach provides a larger measurement distance but, at a longer range for capacitive measurement.

In either circumstance, we are still required to determine tiny changes in driver 44 separation from the rails 12 and this will challenge our capacitive measurement system 30.

3. Measurement System [Ref. 4, Appendix C.]

A capacitive driver position measurement system 30 (FIGS. 9a, 9b, 9c, 10, 11) is proposed. This proposed measurement system (FIG. 9) inputs an ac electric potential 30a to a capacitive impedance circuit terminated in a driven ground 30b [5.]. The capacitive impedance varies only with movement by the driver 44 and is unaffected by movements of the shoes 46, 42. The driven ground 30b provides an amplified measurement of the current that has passed through the capacitive impedance to ground. Nano-step measurements are made by comparing driven ground current 30b readings.

a. Measurement System Design and Performance $$C = \frac{C_1 C_2}{C_1 + C_2} = \frac{C_1}{2} = \frac{\epsilon_0}{2d} \text{ (Capacitors in Series)} \quad (\text{eq. 27})$$

$$V_{in}(\omega) = \frac{I(\omega)}{C} = \frac{I(\omega) 2d}{\epsilon_0 A} \text{ (RMS values)} \quad (\text{eq. 28})$$

$$\frac{I_1(\omega) 2d_1}{\epsilon_0 A} = \frac{I_2(\omega) 2d_2}{\epsilon_0 A} \; (V_{in}(\omega) \text{ same for both readings}) \quad (\text{eq. 29})$$

$$-I(\omega)R = V_{out} \text{ (Driven Ground current meeasurement)} \quad (\text{eq. 30})$$

$$\frac{I_1(\omega)}{I_2(\omega)} = \frac{d_2}{d_1} \text{ (simplify } eq. \text{ C5)} \quad (\text{eq. 31})$$

$$\frac{V(\omega) out_1}{V(\omega) out_2} = \frac{d_2}{d_1} \text{ (substitute in } eq. \text{ C7)} \quad (\text{eq. 32})$$

$$V_2 - V_1 = V_1 \left( \frac{d_1}{d_2} - 1 \right) \quad (\text{eq. 33})$$

b. Performance [15]

The expected performance of the capacitive sensor system 30 will be examined in the prototype. Capacitive sensing is attractive because it is simple and fits and integrates easily and comfortably into the Linear Tape Motor concept. Now we must see if it will work.

Operating near the rails 12 results in:

$$V_1 \left( \frac{0.004}{\left( 0.004 + 5.6238517138564(E-6) \right)} - 1 \right) = -0.0014676436746 V_1 \quad (P32)$$

If we use $V_1 = 10$ volts (easily attainable), we will see an output signal difference on the order of −14.68 millivolts which should easily be picked out from electronic system noise. Using a $V_1 = 1$ volt will lower the signal difference to −1.468 millivolts which should still work.

Operating at the furthest distance from the rails 12 results in:

$$V_1 \left( \frac{\left( 0.014 - 2.7071085744061(E-5) \right)}{0.014} - 1 \right) = -0.0019236489817 V_1 \quad (P33)$$

If we use $V_1 = 10$ volts, we will see an output signal difference on the order of −19.24 millivolts which should easily be picked out from electronic system noise. Using a $V_1$=1-volt will lower the signal difference to −1.924 millivolts which should still work.

The example calculations above show that the Capacitive Sensor System 30 can discriminate nano-steps of 6 (E−9) meters at the extreme driver 44 separation distances and, thereby, at all separation distances in between.

Oscillator 30a frequency also plays a role, the higher the frequency, the larger the displacement current and the larger the displacement current, the larger the output signal voltage. From experience with capacitive sensors, the author (JMV) knows, from experience, that 30 khz will, likely work and 100 khz will work even better (because displacement current will increase). Modern op-amp technology, however, makes up to 1 mhz possible. The resistance in the driven ground 30b of FIGS. 9a, 9b, 9c can be selected to optimally tune the output voltage. [Ref. 5 addresses the driven ground concept 30b.]

c. Magnetic and Electric Field Compatibility (FIGS. 11, 12) [Ref. 4 Appendix C.]

Figure 11:
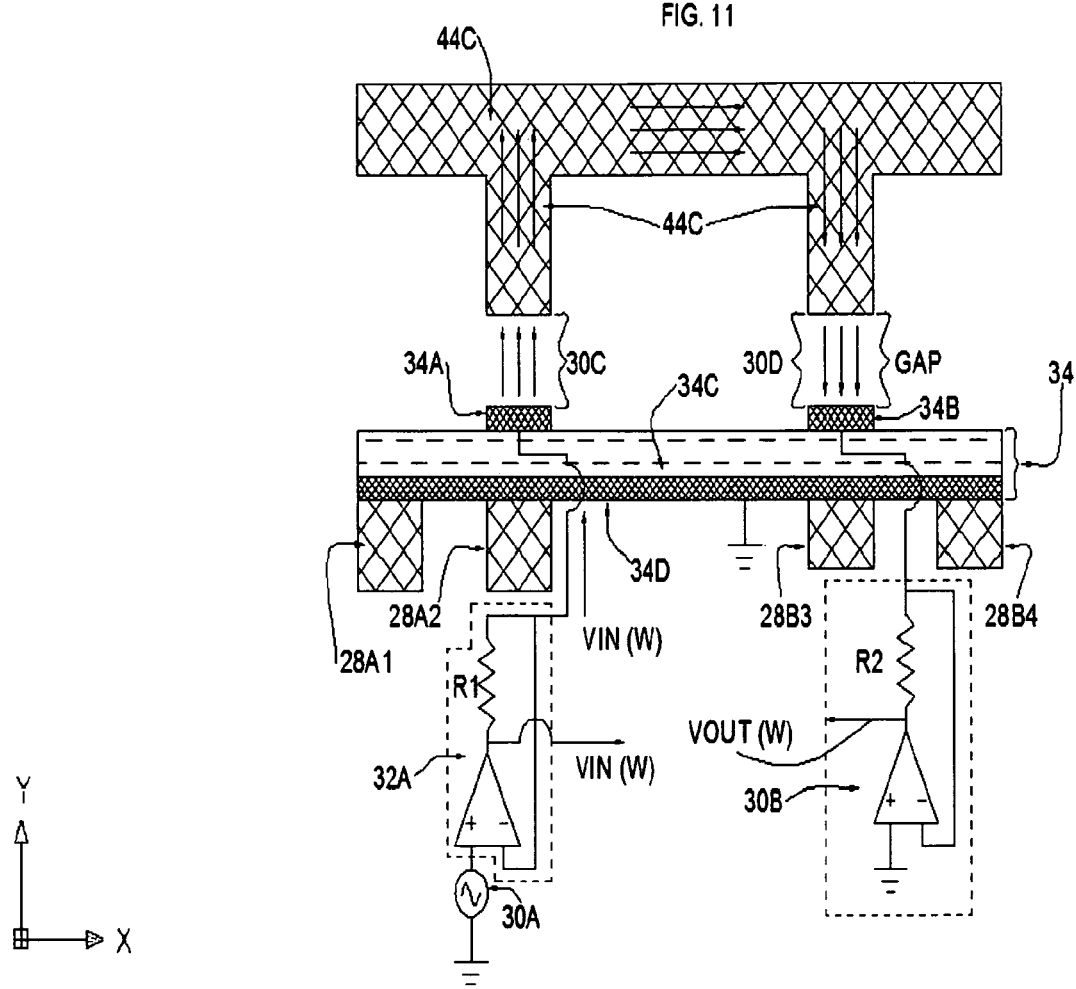
FIG. 11 illustrates details of the capacitive sensing system construction and integration and shows how magnetic and electric fields can share flux path space and operate independently.

This section will show how and why the magnetic circuit and electric circuit are compatible. The critical area where they interact with each other is shown in FIG. 11. The magnetic flux follows a path through 28a2, 34d, 34c, 34a, 30c, 44c, 30d, 34b, 34c, 34d and 28b3. The electric flux follows a path through 34a, 30c, 44c, 30d and 34d. Electric and magnetic flux coexist along 34a, 30c, 44c, 30d and 34d. The path segments 34d, 34c, 34a and 34b are non magnetic and appear as added air gap to the dc magnetic flux and its multilayer thin film construction keeps the added air gap to a minimum, say on the order of 0.002 in. total thickness, for an added 0.004 in. to the magnetic flux path air gaps of 30c and 30d and are easily managed by the permanent magnet flux. The path segment 44c is both electrically and magnetically conductive. The dc magnetic fields will not affect the electric fields according to Maxwell. The ac electric fields will provide an oscillating magnetic field to the dc magnetic field but, these are so small and are reversing direction so fast that the effect will be insignificant. [Additional detail is provided in ref. 4, Appendix C.]

There are remaining incompatibilities that require "tweeks". The addition of a capacitive sensor head (FIG. 11) adds to the air gap the permanent magnets must over come, even when the sensor head is kept very thin. Any increase in air gap will add to fringing in the magnetic field across the gap and this, in turn, will reduce flux density and magnetic force. The additional fringing should be minor enough that the reduction in magnetic force does not show up in the first order calculations presented in this introduction. The Rails will be on the order of 0.125 in wile and the total maximum air gap operating near the rest position will be 0.008 in. The magnetic flux transfer rails 28 are 0.125/0.008=15.625 times larger than the gap and gives confidence that our assumption of a uniform magnetic field across the gap is not significantly harmful. (If this ratio were ∞ there would be no fringing and if the ratio were 0 we would have point attracting poles and total fringing.) Even operating at a maximum air gap of 0.018 in. we still have 0.125/0.018=6.9444 which is still much closer to a parallel plate uniform field than point source total fringing. And, this air gap increase is the same for both the Shoes and Driver so permanent flux (and force) distributions are, essentially, unchanged. Also, the increase in air gap is kept minimal by using a thin pc board configuration. Finite element computer analysis will provide a much clearer picture on what is actually happening and this will become worth-while once an actual funded project is under taken.

Figure 14A:
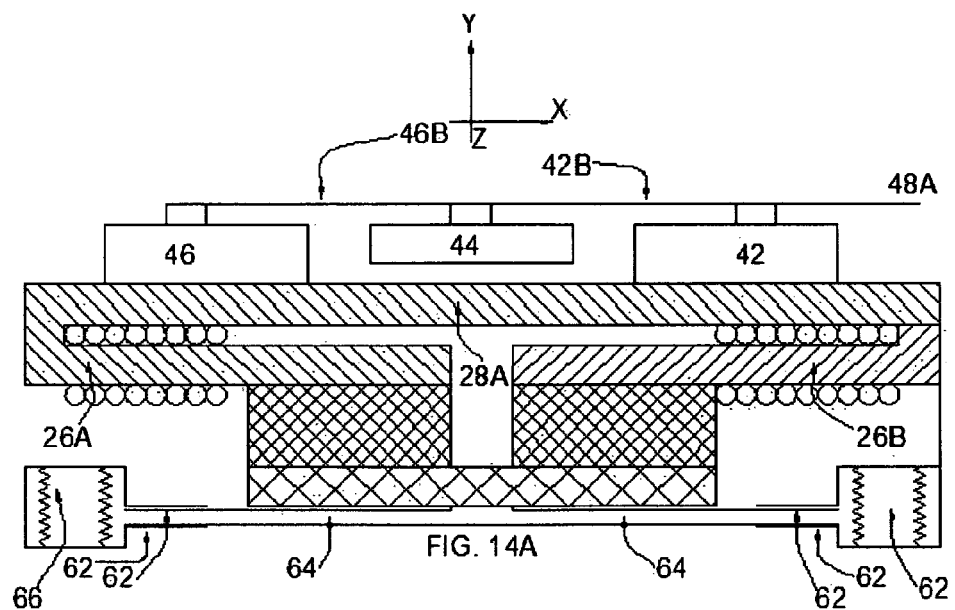
FIGS. 14a, 14b illustrate how a strain gauge system is integrated into a mount structure to measure external forces on the tape slide.
Figure 14B:
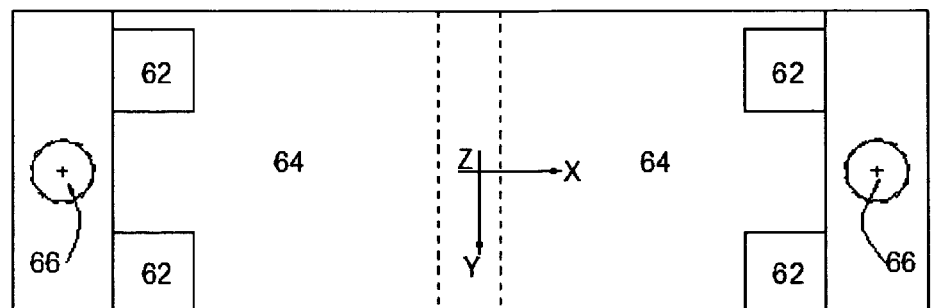

B. Force Measurements (FIGS. 14a, 14b)

This section will show how forces on the tape slide 40 can be measured. Mounting a strain gauge between the housing and the external structure the housing is attached to a cantilever interface, instrumented with strain gauges, can measure external forces on the Tape Slide and on the housing. The payload forces on the tape slide 40 are of particular importance. A rosette of strain gauges 62 can measure external forces on the housing and strain gauge as well. Common commercial strain gauge practice will suffice. The system 60, shown in FIG. 14 is a reasonable approach. It uses strain gauges 62 mounted on flexures 64, positioned between the housing 10 and the fastener mounts 66 to measure the force vector on the tape slide 40 in any of six (6) degrees of freedom. This arrangement does not differentiate between forces directly on the housing 10 and forces on the tape slide 40 that react through the housing 10. In the expected applications, direct forces on the housing 10 do not occur.

In any event, repositioning the tape slide will resolve any ambiguities. If the force is on the tape slide, the reactive forces on the housing will not change but, the measured reactive torques will change according to the position of the tape slide. If the force is on the housing, moving the tape slide will not bring about a change in measurement. A torque on the tape slide must manifest itself as a force on 48a that has a component in some direction other than the axis of travel and moving the tape slide will discriminate this as described directly above.

Having thus shown and described what is at present considered to be the preferred embodiment of the invention, it should be noted that the same has been made by way of illustration and not limitation. Accordingly, all modifications, alterations and changes coming from within the spirit and scope of the invention as set forth in the appended claims are herein to be included.

What is claimed is:

1. A system for moving and guiding a piece of apparatus and attached object (payload) into relationship with another piece of apparatus, comprising:

a mobile apparatus that moves and does work on said external object (payload) by means of repeated bending, unbending motions in response to an external stimulus;

a stationary apparatus that guides said mobile apparatus, exerts reaction forces on said mobile apparatus and supplies controlled power to said mobile apparatus;

means of supplying and controlling power to said mobile apparatus.

means for said mobile apparatus to remain in place with respect to said stationary apparatus with external power off and oppose external force on said mobile apparatus and said attached object (payload).

means for said mobile apparatus and said attached object (payload) to be precisely positioned within said stationary object over relatively long stroke distances.

said mobile apparatus wherein a first and second external component is each connected to an internal component by a bending structure and said first and second external components are each in constant contact with said stationary apparatus whereas said internal component is only in contact with said stationary apparatus when said bending structures are each sufficiently bent whereas said external object (payload) is connected to said second external components as to move with said second external component along said axis of travel without restricting the function of said mobile apparatus or any of its components therein.

wherein directed and controlled power can be supplied to said stationary and mobile apparatus whereby said first external component of said mobile component is fixed and said second external component is freed and thereafter said internal component of said mobile apparatus is moved into contact with said stationary apparatus whereas each of said bending structures bends and free said second end component is pulled towards said fixed first end component and thereafter said free second component is fixed and said fixed first end component is freed and thereafter said internal component is freed whereas stored spring energy in each of said bending structures returns said internal structure to its unbent position whereas said free first end component moves away from said second end component and said mobile apparatus completes a single movement step with respect to said stationary apparatus along said system axis of travel in the second external component to first external component direction and wherein said direction of said completed single step movement can be reversed (said first end component to said second end component direction) by implementing said completed first step movement with reversed operational sequence on said first and second end components and wherein directional said long stroke travel comprises multiple said single movement steps in same direction and wherein said mobile apparatus remains in place with respect to said stationary apparatus and in opposition to external forces with external power off by means of said permanent energy source within said stationary apparatus.

2. A system according to claim 1 wherein said mobile apparatus bending structures bend easily about an axis normal to direction of travel and is stiff in other directions.

3. A system according to claim 1 wherein said direction of travel is linear.

4. A system according to claim 1 wherein said stationary apparatus permanent energy source therein comprise permanent magnets and said stationary apparatus supplied controlled power therein comprise electromagnetic circuits.

5. A system according to claim 1 wherein said mobile apparatus wherein first and second end components with wedge contact surfaces maintain contact with said stationary apparatus fitting tapered slot contact surfaces therein.

6. A system according to claim 3 wherein said mobile apparatus bending structures each act on a said first and second external components with mechanical advantage that increases with decreasing bending angles until infinite mechanical advantage is provided by an unbent structure.

7. A system according to claim 6 with power off wherein said mobile apparatus is stowed with each bending structure bent and internal component in contact with said stationary apparatus.

8. A magnetic circuit apparatus for moving, guiding and securing said mobile piece of apparatus within said stationary piece of apparatus comprising:
  said stationary piece of apparatus including:
    embedded permanent magnets and alternate flux paths wherein magnetic flux can pass through any combination of paths, each of which, extends throughout the length of said mobile apparatus travel;
  at least one electromagnetic coil within each said flux path whereas the amount of permanent magnet flux through said path can be electronically controlled on an individual basis;
  said Contact and guide structure extending the length of said mobile apparatus travel whereas said mobile apparatus is constrained, by contact, to the axis of travel, with magnetic force and friction hold and said contact surfaces establish a fixed air gap to said mobile apparatus in each of alternate magnetic flux paths throughout said long stroke mobile apparatus travel;
  said mobile piece of apparatus including:
    multiple components, equal in number to said magnetic circuit alternate flux paths in said stationary apparatus and connected to each other by a magnetic insulator bending structure;
  whereas each said component uniquely completes one and only one magnetic circuit path in said stationary apparatus and said bending structures magnetically isolate said components from each other;
  whereas each said component includes a fixed air gap in its magnetic circuit when in contact with said stationary apparatus;
  whereas each said component of said mobile apparatus is, independently, forced against said stationary apparatus proportional to the amount of magnetic flux passing through its air gap.

9. A system according to claim 8 whereas electric current in the coils of said stationary apparatus sequentially can direct permanent magnetic flux through various alternative flux paths to move said mobile apparatus.

10. A system according to claim 9 whereas the magnetic flux through any said mobile apparatus component can vary from zero to all available permanent magnet flux and the magnetic flux can be distributed in any amount between said components within said mobile apparatus with the total flux equal to that available from said permanent magnets.

11. A power-off magnetic force distribution system according to claim 8 whereas, the air gaps in each of the alternate flux paths are sized to effect the amount of available permanent magnet flux through each.

12. A power-off magnetic force distribution system according to claim 11 whereas the power-off, friction hold forces and said mobile apparatus configuration can be set by design.

13. A power-off magnetic force distribution system according to claim 11 whereas said mobile apparatus configuration can include all components in contact with said stationary apparatus and bending structures bent.

14. A power-off magnetic flux distribution system according to claim 12 whereas said mobile apparatus configuration has different friction hold forces on each of its components.

15. A power-off magnetic flux distribution system according to claim 14 whereas the configuration and distribution of forces is set to optimize overall system performance.

16. A system that uses structural bending means to reduce friction forces opposing assembly of a first apparatus into a second apparatus and to increase sliding friction forces along the travel axis both during and after assembly and to reduce friction forces opposing disassembly and said system precludes movement in other directions by means of structural interference:
  said system comprises:
    a first apparatus including an opposing pair of flexure wedges wherein each said wedge prefers to bend about an axis parallel to the axis of travel of said first apparatus and
    a second apparatus including contact surfaces whereas each is positioned to contact, position and secure an opposing flexure wedge therein said first apparatus and each is parallel to the axis of travel and extends the length of travel of said first apparatus and
    a means whereas said first apparatus and said second apparatus maintain alignment during non contact and external means to force contact between said flexure wedges and said contact surfaces and thereafter maintain forceful contact between said flexure wedges and said contact surfaces and thereafter provide low force contact between said flexure wedges and said contact surfaces and thereafter force said flexure wedges and said contact surfaces apart and thereafter maintain aligned separation between said flexure wedges and said contact surfaces and wherein said first apparatus and said second apparatus are separated and aligned and thereafter said external means forcefully inserts said first apparatus into contact with said second apparatus whereas said flexure wedges included in said first apparatus press against said contact surfaces included in said second apparatus and contact forces normal to the contacting surfaces are generated whereas friction forces parallel to the contacting surfaces oppose further movement of said first apparatus and thereafter said first apparatus continues to move and increase normal surface contact forces by said bending in each said flexure wedge therein until force equilibrium is reached and said increase in contact forces increases insertion efficiency and friction hold forces along axis of travel whereas said structural interference constrains movement in degrees of freedom other than insertion/extraction and axis of travel and:

wherein said first apparatus and said second apparatus are aligned and forcibly held in contact and said external force is removed whereby each said flexure wedge unbends and relieves residual normal and friction forces and applying said external means to force extraction of said first apparatus from said second apparatus causes reverse direction bending in each said flexure wedge whereby said contacting surfaces are forced apart and extraction and separation efficiency is increased.

17. A system according to claim 16 wherein said contact area of each said flexure wedge has a larger area than its flexure bending cross section.

18. A system according to claim 16 wherein each flexure in each of said flexure wedges is a flat spring.

19. A system according to claim 16 wherein the first apparatus is a solid wedge and the second apparatus contact areas are connected to said second apparatus stiff structure by flexures therein and said flexures are normal to contact areas of said first and second apparatus'.

20. A system according to claim 19 wherein each flexure is a flat spring.

21. A system according to claim 7 wherein a said single step movement is reduced by limiting maximum contact separation distance between said internal component within said mobile apparatus and said stationary apparatus.

22. A system according to claim 21 wherein said limited maximum contact separation distance is measured using capacitive sensing means.

23. A system according to claim 22 wherein flux electric and magnetic flux simultaneously co-exist in a shared flux path.

24. A system according to claim 23 wherein construction modifications to said interior component enable magnetic flux and electric flux to simultaneously share a flux path with maximum magnetic force and maximum capacitive electrode area.

25. A system according to claim 24 wherein said capacitive sensing means measures electric current to virtual ground.

26. A system according to claim 25 wherein separation distance of said internal component can be measured simultaneously with different magnetic flux and magnetic flux density.

27. A system according to claim 26 wherein said separation distance measurement and magnetic flux distribution can be performed simultaneously.

28. A system according to claim 27 wherein said first external component can be fixed to said stationary apparatus and said second external component can be freed from said stationary component.

29. A system according to claim 28 wherein said internal component separation distance from said stationary apparatus can be changed by changing magnetic force thereon and thereby move said second external component and payload object attached thereto.

30. A system according to claim 29 in which the housing apparatus and housing apparatus are connected by flexures whereon strain sensors are attached and
    the strain sensors measure force and torque on said housing in six (6) degrees-of-freedom and
    the forces and toques on said Tape Slide therein said housing are measured by said strain sensors and
    said strain sensors are measured before said tape slide is moved and measured after said tape slide is moved a fixed and known distance and measured after said tape slide has been returned to its original position and
    forces and torques on said tape slide are determined to six-degrees-of-freedom by calculation.

* * * * *